US008352978B2

(12) United States Patent (10) Patent No.: US 8,352,978 B2
Reynolds et al. (45) Date of Patent: *Jan. 8, 2013

(54) SYSTEMS AND METHODS FOR ADVERTISING TELEVISION NETWORKS, CHANNELS, AND PROGRAMS

(75) Inventors: Steven J. Reynolds, Littleton, CO (US);
Robert A. Knee, Lansdale, PA (US);
Michael D. Ellis, Boulder, CO (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/400,649

(22) Filed: Mar. 9, 2009

(65) Prior Publication Data
US 2009/0228912 A1 Sep. 10, 2009

Related U.S. Application Data

(63) Continuation of application No. 10/783,150, filed on Feb. 19, 2004, now Pat. No. 7,503,055, which is a continuation of application No. 09/217,100, filed on Dec. 16, 1998, now Pat. No. 6,742,183.

(60) Provisional application No. 60/085,608, filed on May 15, 1998.

(51) Int. Cl.
*H04N 7/16* (2011.01)
*H04N 7/10* (2006.01)
*H04N 7/025* (2006.01)

(52) U.S. Cl. .......................................... 725/25; 725/32
(58) Field of Classification Search ................ 725/25–31
See application file for complete search history.

(56) References Cited

U.S. PATENT DOCUMENTS
4,355,415 A 10/1982 George et al.
(Continued)

FOREIGN PATENT DOCUMENTS
CN 1129879 8/1996
(Continued)

OTHER PUBLICATIONS

U.S. Appl. No. 09/332,244, dated Jun. 11, 1999, Ellis.

(Continued)

*Primary Examiner* — Robert Hance
(74) *Attorney, Agent, or Firm* — Ropes & Gray LLP

(57) ABSTRACT

The present invention allows control of the presentation of advertisements that are associated with television networks, channels, and programs, and enables a single broadcasting of each advertisement associated with a network to be made to numerous television systems in parallel. The presentation of advertisements that are associated with television networks, channels, and programs is controlled in the present invention by determining at television viewer equipment whether the television networks, channels, or programs with which the advertisements are associated are unavailable to the television viewer or are undesirable to the television viewer. Once this determination has been made, the television viewer equipment then presents the advertisements, or selects and presents suitable alternative advertisements. A single broadcasting of each network advertisement to all television systems is enabled in the present invention by broadcasting each advertisement with a network identifier to all television systems. At the television systems, the network identifier and channel map or program guide information located in television viewer equipment are then used by an interactive program guide or other application running in the television viewer equipment to determine whether a local affiliate for that network is available and not designated as undesirable by the television viewer. If the local affiliate is available and not designated as undesirable, the advertisement is then presented to the television viewer, otherwise a suitable alternative advertisement is then identified and presented to the television viewer.

16 Claims, 19 Drawing Sheets

U.S. PATENT DOCUMENTS

| | | | |
|---|---|---|---|
| 4,429,385 A | 1/1984 | Chichelli et al. | |
| 4,488,179 A | 12/1984 | Kruger et al. | |
| 4,573,072 A | 2/1986 | Freeman | |
| 4,602,279 A | 7/1986 | Freeman et al. | |
| 4,605,964 A | 8/1986 | Chard | |
| 4,625,080 A | 12/1986 | Scott | |
| 4,635,109 A | 1/1987 | Comeau | |
| 4,694,490 A | 9/1987 | Harvey et al. | |
| 4,704,725 A | 11/1987 | Harvey et al. | |
| 4,706,121 A | 11/1987 | Young | |
| 4,718,107 A | 1/1988 | Hayes | |
| 4,750,213 A * | 6/1988 | Novak | 455/3.01 |
| 4,751,578 A | 6/1988 | Reiter | |
| 4,761,684 A | 8/1988 | Clark et al. | |
| 4,787,063 A | 11/1988 | Muguet | |
| 4,814,883 A | 3/1989 | Perine et al. | |
| 4,847,698 A | 7/1989 | Freeman | |
| 4,847,699 A | 7/1989 | Freeman | |
| 4,847,700 A | 7/1989 | Freeman | |
| 4,857,999 A | 8/1989 | Welsh | |
| 4,864,429 A | 9/1989 | Eigeldinger et al. | |
| 4,908,707 A | 3/1990 | Kinghorn | |
| 4,930,158 A | 5/1990 | Vogel | |
| 4,945,563 A | 7/1990 | Horton et al. | |
| 4,959,720 A | 9/1990 | Duffield et al. | |
| 4,965,825 A | 10/1990 | Harvey et al. | |
| 4,977,455 A | 12/1990 | Young | |
| 5,036,314 A | 7/1991 | Barillari et al. | |
| 5,038,211 A | 8/1991 | Hallenbeck | |
| 5,047,867 A | 9/1991 | Strubbe et al. | |
| 5,089,885 A | 2/1992 | Clark | |
| 5,093,921 A | 3/1992 | Bevins, Jr. | |
| 5,099,319 A | 3/1992 | Esch et al. | |
| 5,109,279 A | 4/1992 | Ando | |
| 5,109,414 A | 4/1992 | Harvey et al. | |
| 5,113,259 A | 5/1992 | Romesburg et al. | |
| 5,132,992 A | 7/1992 | Yurt et al. | |
| 5,134,719 A | 7/1992 | Mankovitz | |
| 5,151,789 A | 9/1992 | Young | |
| 5,155,591 A | 10/1992 | Wachob | |
| 5,162,905 A | 11/1992 | Itoh et al. | |
| 5,172,413 A | 12/1992 | Bradley et al. | |
| 5,175,627 A | 12/1992 | Josephs | |
| 5,200,822 A | 4/1993 | Bronfin et al. | |
| 5,208,670 A | 5/1993 | Sugimori et al. | |
| 5,210,611 A | 5/1993 | Yee et al. | |
| 5,216,515 A | 6/1993 | Steele et al. | |
| 5,223,924 A | 6/1993 | Strubbe et al. | |
| RE34,340 E | 8/1993 | Freeman | |
| 5,233,423 A | 8/1993 | Jernigan et al. | |
| 5,233,654 A | 8/1993 | Harvey et al. | |
| 5,241,428 A | 8/1993 | Goldwasser et al. | |
| 5,253,066 A | 10/1993 | Vogel | |
| 5,283,639 A | 2/1994 | Esch et al. | |
| 5,285,284 A | 2/1994 | Takashima et al. | |
| 5,323,234 A | 6/1994 | Kawasaki | |
| 5,331,349 A | 7/1994 | Kim | |
| 5,335,277 A | 8/1994 | Harvey et al. | |
| 5,353,121 A | 10/1994 | Young et al. | |
| 5,357,276 A | 10/1994 | Banker | |
| 5,359,367 A | 10/1994 | Stockill | |
| 5,359,601 A | 10/1994 | Wasilewski et al. | |
| 5,361,098 A | 11/1994 | Lucas | |
| 5,371,551 A | 12/1994 | Logan et al. | |
| 5,382,983 A | 1/1995 | Kwoh et al. | |
| 5,410,326 A | 4/1995 | Goldstein | |
| 5,410,344 A | 4/1995 | Graves et al. | |
| 5,412,720 A | 5/1995 | Hoarty | |
| 5,414,756 A | 5/1995 | Levine | |
| 5,416,508 A | 5/1995 | Sakuma et al. | |
| 5,424,770 A | 6/1995 | Schmelzer et al. | |
| 5,438,423 A | 8/1995 | Lynch et al. | |
| 5,442,389 A | 8/1995 | Blahut et al. | |
| 5,442,403 A | 8/1995 | Yasumoto et al. | |
| 5,446,488 A | 8/1995 | Vogel | |
| 5,446,919 A | 8/1995 | Wilkins | |
| 5,449,522 A | 9/1995 | Hill | |
| 5,455,570 A | 10/1995 | Cook et al. | |
| 5,459,522 A | 10/1995 | Pint | |
| 5,461,415 A | 10/1995 | Wolf et al. | |
| 5,465,113 A | 11/1995 | Gilboy | |
| 5,469,206 A | 11/1995 | Strubbe et al. | |
| 5,479,266 A | 12/1995 | Young et al. | |
| 5,479,268 A | 12/1995 | Young et al. | |
| 5,481,296 A | 1/1996 | Cragun et al. | |
| 5,483,278 A | 1/1996 | Strubbe et al. | |
| 5,485,197 A | 1/1996 | Hoarty | |
| 5,485,219 A | 1/1996 | Woo et al. | |
| 5,502,504 A | 3/1996 | Marshall et al. | |
| 5,509,908 A | 4/1996 | Hillstead et al. | |
| 5,515,098 A | 5/1996 | Carles | |
| 5,517,257 A | 5/1996 | Dunn et al. | |
| 5,523,794 A | 6/1996 | Mankovitz et al. | |
| 5,523,796 A | 6/1996 | Marshall et al. | |
| 5,524,195 A | 6/1996 | Clanton, III et al. | |
| 5,526,034 A | 6/1996 | Hoarty et al. | |
| 5,526,035 A | 6/1996 | Lappington et al. | |
| 5,528,304 A | 6/1996 | Cherrick et al. | |
| 5,532,735 A | 7/1996 | Blahut et al. | |
| 5,534,911 A | 7/1996 | Levitan | |
| 5,537,141 A | 7/1996 | Harper et al. | |
| 5,539,449 A | 7/1996 | Blahut et al. | |
| 5,539,822 A | 7/1996 | Lett | |
| 5,543,929 A | 8/1996 | Mankovitz et al. | |
| 5,546,488 A | 8/1996 | Kitamura et al. | |
| 5,550,576 A | 8/1996 | Klosterman | |
| 5,557,338 A | 9/1996 | Maze et al. | |
| 5,559,548 A | 9/1996 | Davis et al. | |
| 5,559,549 A | 9/1996 | Hendricks et al. | |
| 5,559,550 A | 9/1996 | Mankovitz | |
| 5,561,516 A | 10/1996 | Noble et al. | |
| 5,568,272 A | 10/1996 | Levine | |
| 5,570,295 A | 10/1996 | Isenberg et al. | |
| 5,572,442 A | 11/1996 | Schulhof et al. | |
| 5,579,239 A | 11/1996 | Freeman et al. | |
| 5,582,364 A | 12/1996 | Trulin et al. | |
| 5,583,560 A | 12/1996 | Florin et al. | |
| 5,583,561 A | 12/1996 | Baker et al. | |
| 5,583,563 A | 12/1996 | Wanderscheid et al. | |
| 5,585,838 A | 12/1996 | Lawler et al. | |
| 5,585,858 A | 12/1996 | Harper et al. | |
| 5,585,865 A | 12/1996 | Amano et al. | |
| 5,585,866 A | 12/1996 | Miller et al. | |
| 5,589,892 A | 12/1996 | Knee et al. | |
| 5,592,551 A | 1/1997 | Lett et al. | |
| 5,594,507 A | 1/1997 | Hoarty | |
| 5,594,509 A | 1/1997 | Florin et al. | |
| 5,596,373 A | 1/1997 | White et al. | |
| 5,600,364 A | 2/1997 | Hendricks et al. | |
| 5,600,366 A | 2/1997 | Schulman | |
| 5,600,573 A | 2/1997 | Hendricks et al. | |
| 5,602,582 A | 2/1997 | Wanderscheid et al. | |
| 5,606,374 A | 2/1997 | Bertram | |
| 5,610,653 A | 3/1997 | Abecassis | |
| 5,617,526 A | 4/1997 | Oran et al. | |
| 5,619,247 A | 4/1997 | Russo | |
| 5,619,249 A | 4/1997 | Billock et al. | |
| 5,619,274 A | 4/1997 | Roop et al. | |
| 5,621,456 A | 4/1997 | Florin et al. | |
| 5,623,613 A | 4/1997 | Rowe et al. | |
| 5,629,732 A | 5/1997 | Moskowitz et al. | |
| 5,629,733 A | 5/1997 | Youman et al. | |
| 5,630,119 A | 5/1997 | Aristides et al. | |
| 5,631,995 A | 5/1997 | Weissensteiner et al. | |
| 5,632,007 A | 5/1997 | Freeman | |
| 5,635,978 A | 6/1997 | Alten et al. | |
| 5,635,979 A | 6/1997 | Kostreski et al. | |
| 5,640,484 A | 6/1997 | Mankovitz | |
| 5,648,824 A | 7/1997 | Dunn et al. | |
| 5,650,831 A | 7/1997 | Farwell | |
| 5,652,615 A | 7/1997 | Bryant et al. | |
| 5,654,748 A | 8/1997 | Matthews et al. | |
| 5,654,886 A | 8/1997 | Zereski, Jr. et al. | |
| 5,657,072 A | 8/1997 | Aristides et al. | |
| 5,657,414 A | 8/1997 | Lett et al. | |
| 5,659,350 A | 8/1997 | Hendricks et al. | |
| 5,661,516 A | 8/1997 | Carles | |

| | | | | | |
|---|---|---|---|---|---|
| 5,663,757 A | 9/1997 | Morales | 5,838,314 A | 11/1998 | Neel et al. |
| 5,666,293 A | 9/1997 | Metz et al. | 5,841,433 A | 11/1998 | Chaney |
| 5,666,645 A | 9/1997 | Thomas et al. | 5,844,620 A | 12/1998 | Coleman et al. |
| 5,675,390 A | 10/1997 | Schindler et al. | 5,847,750 A | 12/1998 | Srivastava et al. |
| 5,682,195 A | 10/1997 | Hendricks et al. | 5,850,218 A | 12/1998 | LaJoie et al. |
| 5,682,196 A | 10/1997 | Freeman | 5,858,866 A | 1/1999 | Miller et al. |
| 5,682,206 A | 10/1997 | Wehmeyer et al. | 5,861,881 A | 1/1999 | Freeman et al. |
| 5,684,525 A | 11/1997 | Klosterman | 5,867,233 A | 2/1999 | Tanaka |
| 5,689,648 A | 11/1997 | Diaz et al. | 5,873,022 A | 2/1999 | Huizer et al. |
| 5,692,214 A | 11/1997 | Levine | 5,880,768 A | 3/1999 | Lemmons et al. |
| 5,694,163 A | 12/1997 | Harrison | 5,884,141 A | 3/1999 | Inoue et al. |
| 5,694,381 A | 12/1997 | Sako et al. | 5,886,731 A | 3/1999 | Ebisawa |
| 5,696,905 A | 12/1997 | Reimer et al. | 5,886,732 A | 3/1999 | Humpleman |
| 5,699,107 A | 12/1997 | Lawler et al. | 5,887,243 A | 3/1999 | Harvey et al. |
| 5,699,125 A | 12/1997 | Rzeszewski et al. | 5,892,535 A | 4/1999 | Allen et al. |
| 5,701,383 A | 12/1997 | Russo et al. | 5,907,323 A | 5/1999 | Lawler et al. |
| 5,708,478 A | 1/1998 | Tognazzini | 5,907,366 A | 5/1999 | Farmer et al. |
| 5,710,601 A | 1/1998 | Marshall et al. | 5,914,746 A | 6/1999 | Matthews, III et al. |
| 5,710,815 A | 1/1998 | Ming et al. | 5,917,830 A | 6/1999 | Chen et al. |
| 5,717,452 A | 2/1998 | Janin et al. | 5,929,849 A | 7/1999 | Kikinis |
| 5,721,827 A | 2/1998 | Logan et al. | 5,940,073 A | 8/1999 | Klosterman et al. |
| 5,721,829 A | 2/1998 | Dunn et al. | 5,940,572 A | 8/1999 | Balaban et al. |
| 5,724,091 A | 3/1998 | Freeman et al. | 5,956,026 A | 9/1999 | Ratakonda |
| 5,724,472 A | 3/1998 | Abecassis | 5,959,623 A | 9/1999 | van Hoff et al. |
| 5,729,280 A | 3/1998 | Inoue et al. | 5,961,603 A | 10/1999 | Kunkel et al. |
| 5,734,853 A | 3/1998 | Hendricks et al. | 5,973,684 A | 10/1999 | Brooks et al. |
| 5,734,893 A | 3/1998 | Li et al. | 5,974,222 A | 10/1999 | Yuen et al. |
| 5,740,549 A | 4/1998 | Reilly et al. | 5,977,964 A | 11/1999 | Williams et al. |
| 5,745,710 A | 4/1998 | Clanton, III et al. | 5,978,766 A | 11/1999 | Macovski |
| 5,748,191 A | 5/1998 | Rozak et al. | 5,987,210 A | 11/1999 | Iggulden et al. |
| 5,748,716 A | 5/1998 | Levine | 5,988,078 A | 11/1999 | Levine |
| 5,751,282 A | 5/1998 | Girard et al. | 5,990,881 A | 11/1999 | Inoue et al. |
| 5,751,335 A * | 5/1998 | Shintani .................. 725/25 | 5,995,092 A | 11/1999 | Yuen et al. |
| 5,752,159 A | 5/1998 | Faust et al. | 5,600,257 A | 12/1999 | Siezak |
| 5,754,253 A | 5/1998 | Lee | 6,002,393 A | 12/1999 | Hite et al. |
| 5,754,771 A | 5/1998 | Epperson et al. | 6,002,394 A | 12/1999 | Schein et al. |
| 5,757,417 A | 5/1998 | Aras et al. | 6,005,597 A | 12/1999 | Barrett et al. |
| 5,758,257 A | 5/1998 | Herz et al. | 6,005,603 A | 12/1999 | Flavin |
| 5,758,259 A | 5/1998 | Lawler | 6,006,257 A | 12/1999 | Slezak |
| 5,760,821 A | 6/1998 | Ellis et al. | 6,006,265 A | 12/1999 | Rangan et al. |
| 5,761,601 A | 6/1998 | Nemirofsky | 6,014,137 A | 1/2000 | Burns |
| 5,761,606 A | 6/1998 | Wolzien | 6,014,184 A | 1/2000 | Knee et al. |
| 5,768,528 A | 6/1998 | Stumm | 6,018,765 A | 1/2000 | Durana et al. |
| 5,774,170 A | 6/1998 | Hite et al. | 6,018,768 A | 1/2000 | Ullman et al. |
| 5,774,186 A | 6/1998 | Brodsky et al. | 6,020,912 A | 2/2000 | De Lang |
| 5,774,534 A | 6/1998 | Myer | 6,025,837 A | 2/2000 | Matthews, III et al. |
| 5,774,664 A | 6/1998 | Hidary et al. | 6,029,045 A | 2/2000 | Picco et al. |
| 5,774,666 A | 6/1998 | Portuesi | 6,038,367 A | 3/2000 | Abecassis |
| 5,778,181 A | 7/1998 | Hidary et al. | 6,049,539 A | 4/2000 | Lee et al. |
| 5,778,182 A | 7/1998 | Cathey et al. | 6,049,824 A | 4/2000 | Simonin |
| 5,781,226 A | 7/1998 | Sheehan | 6,057,872 A | 5/2000 | Candelore |
| 5,781,228 A | 7/1998 | Sposato | 6,061,719 A | 5/2000 | Bendinelli et al. |
| 5,781,246 A | 7/1998 | Alten et al. | 6,064,376 A | 5/2000 | Berezowski et al. |
| 5,787,259 A | 7/1998 | Haroun et al. | 6,067,303 A | 5/2000 | Aaker et al. |
| 5,788,507 A | 8/1998 | Redford et al. | 6,075,551 A | 6/2000 | Berezowski et al. |
| 5,790,202 A | 8/1998 | Kummer et al. | 6,078,348 A | 6/2000 | Klosterman et al. |
| 5,793,964 A | 8/1998 | Rogers et al. | 6,097,383 A | 8/2000 | Gaughan et al. |
| 5,796,952 A | 8/1998 | Davis et al. | 6,097,441 A | 8/2000 | Allport |
| 5,798,785 A | 8/1998 | Hendricks et al. | 6,104,334 A | 8/2000 | Allport |
| 5,802,284 A | 9/1998 | Karlton et al. | 6,130,726 A | 10/2000 | Darbee et al. |
| 5,805,154 A | 9/1998 | Brown | 6,141,488 A | 10/2000 | Knudson et al. |
| 5,805,763 A | 9/1998 | Lawler et al. | 6,144,375 A | 11/2000 | Jain et al. |
| 5,805,804 A | 9/1998 | Laursen et al. | 6,151,017 A | 11/2000 | Suzuoka et al. |
| 5,805,974 A | 9/1998 | Hite et al. | 6,151,059 A | 11/2000 | Schein et al. |
| 5,808,608 A | 9/1998 | Young et al. | 6,157,413 A | 12/2000 | Hanafee et al. |
| 5,812,123 A | 9/1998 | Rowe et al. | 6,160,545 A | 12/2000 | Eyer et al. |
| 5,812,931 A | 9/1998 | Yuen | 6,160,546 A | 12/2000 | Thompson et al. |
| 5,812,937 A | 9/1998 | Takahisa et al. | 6,172,677 B1 | 1/2001 | Stautner et al. |
| 5,815,671 A | 9/1998 | Morrison | 6,173,271 B1 | 1/2001 | Goodman et al. |
| 5,818,438 A | 10/1998 | Howe et al. | 6,177,931 B1 | 1/2001 | Alexander et al. |
| 5,818,439 A | 10/1998 | Nagasaka et al. | 6,182,050 B1 | 1/2001 | Ballard |
| 5,818,935 A | 10/1998 | Maa | 6,186,443 B1 | 2/2001 | Shaffer |
| 5,819,019 A | 10/1998 | Nelson | 6,191,780 B1 | 2/2001 | Martin et al. |
| 5,822,123 A | 10/1998 | Davis et al. | 6,198,509 B1 | 3/2001 | Dougherty et al. |
| 5,826,168 A | 10/1998 | Inoue et al. | 6,208,384 B1 | 3/2001 | Schultheiss |
| 5,828,370 A | 10/1998 | Moeller et al. | 6,209,129 B1 | 3/2001 | Carr |
| 5,828,420 A | 10/1998 | Marshall et al. | 6,209,130 B1 | 3/2001 | Rector, Jr. et al. |
| 5,828,945 A | 10/1998 | Klosterman | 6,233,734 B1 | 5/2001 | Macrae et al. |
| 5,830,068 A | 11/1998 | Brenner et al. | 6,239,794 B1 | 5/2001 | Yuen et al. |

| | | |
|---|---|---|
| 6,263,501 B1 | 7/2001 | Schein et al. |
| 6,268,849 B1 | 7/2001 | Boyer et al. |
| 6,310,886 B1 | 10/2001 | Barton |
| 6,323,911 B1 | 11/2001 | Schein et al. |
| 6,331,877 B1 | 12/2001 | Bennington et al. |
| 6,354,378 B1 | 3/2002 | Patel |
| 6,357,043 B1 | 3/2002 | Ellis et al. |
| 6,381,582 B1 | 4/2002 | Walker et al. |
| 6,388,714 B1 | 5/2002 | Schein et al. |
| 6,400,407 B1 | 6/2002 | Zigmond et al. |
| 6,430,743 B1 | 8/2002 | Matsuura et al. |
| 6,446,261 B1 | 9/2002 | Rosser |
| 6,460,018 B1 | 10/2002 | Kiasai et al. |
| 6,463,585 B1 | 10/2002 | Hendricks et al. |
| 6,477,579 B1 | 11/2002 | Kunkel et al. |
| 6,483,986 B1 | 11/2002 | Krapf |
| 6,483,987 B1 | 11/2002 | Goldschmidt Iki et al. |
| 6,486,920 B2 | 11/2002 | Arai et al. |
| 6,490,722 B1 | 12/2002 | Barton et al. |
| 6,546,556 B1 | 4/2003 | Kataoka et al. |
| 6,564,378 B1 | 5/2003 | Satterfield |
| 6,574,424 B1 | 6/2003 | Dimitri et al. |
| 6,580,870 B1 | 6/2003 | Kanazawa et al. |
| 6,581,207 B1 | 6/2003 | Sumita et al. |
| 6,594,825 B1 | 7/2003 | Goldschmidt Iki et al. |
| 6,598,228 B2 | 7/2003 | Hejna, Jr. |
| 6,609,253 B1 | 8/2003 | Swix et al. |
| 6,611,654 B1 | 8/2003 | Shteyn |
| 6,614,987 B1 | 9/2003 | Ismail et al. |
| 6,637,027 B1 | 10/2003 | Breslauer et al. |
| 6,642,939 B1 | 11/2003 | Vallone et al. |
| 6,660,503 B2 | 12/2003 | Kierulff |
| 6,698,020 B1 | 2/2004 | Zigmond et al. |
| 6,701,528 B1 | 3/2004 | Arsenault et al. |
| 6,704,491 B1 | 3/2004 | Revis |
| 6,728,713 B1 | 4/2004 | Beach et al. |
| 6,738,978 B1 | 5/2004 | Hendricks et al. |
| 6,742,183 B1 | 5/2004 | Reynolds et al. |
| 6,751,776 B1 | 6/2004 | Gong |
| 6,751,800 B1 | 6/2004 | Fukuda et al. |
| 6,756,997 B1 | 6/2004 | Ward, III et al. |
| 6,757,906 B1 | 6/2004 | Look et al. |
| 6,760,537 B2 | 7/2004 | Mankovitz |
| 6,799,326 B2 | 9/2004 | Boylan et al. |
| 6,802,074 B1 | 10/2004 | Mitsui et al. |
| 6,813,775 B1 | 11/2004 | Finseth et al. |
| 6,837,789 B2 | 1/2005 | Garahi et al. |
| 6,847,778 B1 | 1/2005 | Vallone et al. |
| 6,850,691 B1 | 2/2005 | Stam et al. |
| 6,868,440 B1 | 3/2005 | Gupta et al. |
| 6,950,624 B2 | 9/2005 | Kim et al. |
| 6,973,669 B2 | 12/2005 | Daniels |
| 7,017,173 B1 | 3/2006 | Armstrong et al. |
| 7,020,704 B1 | 3/2006 | Lipscomb et al. |
| 7,079,176 B1 | 7/2006 | Freeman et al. |
| 7,088,952 B1 | 8/2006 | Saito et al. |
| 7,134,136 B2 | 11/2006 | Hanai et al. |
| 7,185,353 B2 | 2/2007 | Schlack |
| 7,194,754 B2 | 3/2007 | Tomsen et al. |
| 7,200,852 B1 | 4/2007 | Block |
| 7,263,709 B1 | 8/2007 | Krapf |
| 7,359,619 B1 | 4/2008 | O'Connor et al. |
| 7,503,055 B2 | 3/2009 | Reynolds et al. |
| 7,584,491 B2 | 9/2009 | Bruckner et al. |
| 7,716,700 B2 | 5/2010 | Carlucci et al. |
| 2001/0029610 A1 | 10/2001 | Corvin et al. |
| 2001/0047298 A1 | 11/2001 | Moore et al. |
| 2001/0049820 A1 | 12/2001 | Barton |
| 2002/0037160 A1 | 3/2002 | Locket et al. |
| 2002/0054062 A1* | 5/2002 | Gerba et al. ............ 345/716 |
| 2002/0056087 A1 | 5/2002 | Berezowski et al. |
| 2002/0083439 A1 | 6/2002 | Eldering |
| 2002/0083441 A1 | 6/2002 | Flickinger et al. |
| 2002/0090203 A1 | 7/2002 | Mankovitz |
| 2002/0092017 A1 | 7/2002 | Klosterman et al. |
| 2002/0104090 A1 | 8/2002 | Stettner |
| 2002/0124249 A1 | 9/2002 | Shintani et al. |
| 2002/0144262 A1 | 10/2002 | Plotnick et al. |
| 2002/0146233 A1 | 10/2002 | Barton et al. |
| 2002/0166120 A1* | 11/2002 | Boylan et al. ............ 725/35 |
| 2002/0174430 A1 | 11/2002 | Ellis et al. |
| 2002/0191954 A1 | 12/2002 | Beach et al. |
| 2002/0199186 A1 | 12/2002 | Ali et al. |
| 2003/0026589 A1 | 2/2003 | Barton et al. |
| 2003/0028761 A1 | 2/2003 | Platt |
| 2003/0037068 A1 | 2/2003 | Thomas et al. |
| 2003/0037333 A1 | 2/2003 | Ghashghai et al. |
| 2003/0056219 A1 | 3/2003 | Reichardt et al. |
| 2003/0110499 A1 | 6/2003 | Knudson et al. |
| 2003/0131252 A1 | 7/2003 | Barton |
| 2003/0131359 A1 | 7/2003 | Moskowitz |
| 2003/0163813 A1 | 8/2003 | Klosterman et al. |
| 2003/0163832 A1 | 8/2003 | Tsuria et al. |
| 2003/0164858 A1 | 9/2003 | Klosterman et al. |
| 2003/0182567 A1 | 9/2003 | Barton et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0208756 A1 | 11/2003 | Macrae et al. |
| 2003/0219227 A1 | 11/2003 | Otala et al. |
| 2004/0013406 A1 | 1/2004 | Barton et al. |
| 2004/0013409 A1 | 1/2004 | Beach et al. |
| 2004/0223747 A1 | 11/2004 | Otala et al. |
| 2004/0237102 A1 | 11/2004 | Konig et al. |
| 2004/0261096 A1 | 12/2004 | Matz |
| 2005/0076359 A1 | 4/2005 | Pierson et al. |
| 2005/0120373 A1 | 6/2005 | Thomas et al. |
| 2005/0204388 A1 | 9/2005 | Knudson et al. |
| 2005/0240961 A1 | 10/2005 | Jerding et al. |
| 2005/0244138 A1 | 11/2005 | O'Connor et al. |
| 2005/0251827 A1 | 11/2005 | Ellis et al. |
| 2005/0283796 A1 | 12/2005 | Flickinger |
| 2006/0031883 A1 | 2/2006 | Ellis et al. |
| 2006/0271980 A1 | 11/2006 | Mankovitz |
| 2007/0266400 A1 | 11/2007 | Rogers et al. |
| 2008/0127246 A1 | 5/2008 | Sylvain |
| 2008/0282285 A1 | 11/2008 | Thomas et al. |
| 2009/0228912 A1 | 9/2009 | Reynolds et al. |
| 2010/0106574 A1 | 4/2010 | Cartwright |
| 2010/0175080 A1 | 7/2010 | Yuen et al. |
| 2010/0192177 A1 | 7/2010 | Thomas et al. |

FOREIGN PATENT DOCUMENTS

| | | |
|---|---|---|
| CN | 1164162 | 11/1997 |
| CN | 1226030 | 8/1999 |
| DE | 3151492 | 7/1983 |
| DE | 19531121 | 2/1997 |
| DE | 19740079 | 3/1999 |
| EP | 0013096 | 7/1980 |
| EP | 0322909 | 7/1989 |
| EP | 0382764 | 8/1990 |
| EP | 0424648 | 5/1991 |
| EP | 0589369 | 3/1994 |
| EP | 0725539 | 8/1996 |
| EP | 0737007 | 10/1996 |
| EP | 0752767 | 1/1997 |
| EP | 0773682 | 5/1997 |
| EP | 0774853 | 5/1997 |
| EP | 0788106 A1 | 8/1997 |
| EP | 0793225 | 9/1997 |
| EP | 0798921 | 10/1997 |
| EP | 0803701 | 10/1997 |
| EP | 0805594 | 11/1997 |
| EP | 0811940 | 12/1997 |
| EP | 0822718 | 2/1998 |
| EP | 0838820 | 4/1998 |
| EP | 0981248 | 2/2000 |
| EP | 1499113 | 1/2005 |
| EP | 1095504 | 3/2005 |
| EP | 1705908 | 9/2006 |
| GB | 2227622 | 8/1990 |
| GB | 2265792 | 10/1993 |
| GB | 2307381 | 5/1997 |
| JP | 03022770 | 1/1991 |
| JP | 03063990 | 3/1991 |
| JP | 6-22315 | 1/1994 |
| JP | 0856352 | 2/1996 |
| JP | 08076778 | 3/1996 |

| | | |
|---|---|---|
| JP | 8-505498 | 6/1996 |
| JP | 8-506939 | 7/1996 |
| JP | 09102827 | 4/1997 |
| JP | 9130346 | 5/1997 |
| JP | 9-510327 | 10/1997 |
| JP | 10-108145 | 4/1998 |
| JP | 11341370 | 12/1999 |
| RO | 247388 | 10/1994 |
| WO | WO 8703766 | 6/1987 |
| WO | WO 8804507 | 6/1988 |
| WO | WO 8902682 | 3/1989 |
| WO | WO 8903085 | 4/1989 |
| WO | WO 9323957 | 11/1993 |
| WO | WO 9414282 | 6/1994 |
| WO | WO 9414284 | 6/1994 |
| WO | WO 9501056 | 1/1995 |
| WO | WO 9501059 | 1/1995 |
| WO | WO 9504431 | 2/1995 |
| WO | WO 95/07003 | 3/1995 |
| WO | WO 9510910 | 4/1995 |
| WO | WO 9633572 | 4/1995 |
| WO | WO 9528055 | 10/1995 |
| WO | WO 95/32585 | 11/1995 |
| WO | WO 9531069 | 11/1995 |
| WO | WO 96/09721 | 3/1996 |
| WO | WO 9607270 | 3/1996 |
| WO | WO 9613932 | 5/1996 |
| WO | WO 9620555 | 7/1996 |
| WO | WO 96/34491 | 10/1996 |
| WO | WO 9634486 | 10/1996 |
| WO | WO 96/41471 | 12/1996 |
| WO | WO 9641478 | 12/1996 |
| WO | WO 9703521 | 1/1997 |
| WO | WO 9704595 | 2/1997 |
| WO | WO 9904595 | 2/1997 |
| WO | WO 9713368 | 4/1997 |
| WO | WO 97/18675 | 5/1997 |
| WO | WO 9719555 | 5/1997 |
| WO | WO 97/31480 | 8/1997 |
| WO | WO 9729458 | 8/1997 |
| WO | WO 9736422 | 10/1997 |
| WO | WO 97/42763 | 11/1997 |
| WO | WO 97/48230 | 12/1997 |
| WO | WO 97/49237 | 12/1997 |
| WO | WO 97/49242 | 12/1997 |
| WO | WO 9746943 | 12/1997 |
| WO | WO 9747106 | 12/1997 |
| WO | WO 9747124 | 12/1997 |
| WO | WO 9747135 | 12/1997 |
| WO | WO 9747143 | 12/1997 |
| WO | WO 9749241 | 12/1997 |
| WO | WO 9750251 | 12/1997 |
| WO | WO 9800975 | 1/1998 |
| WO | WO 9800976 | 1/1998 |
| WO | WO 9904561 | 1/1998 |
| WO | WO 98/06219 | 2/1998 |
| WO | WO 9810589 | 3/1998 |
| WO | WO 9816062 | 4/1998 |
| WO | WO 9817064 | 4/1998 |
| WO | WO 98/20675 | 5/1998 |
| WO | WO 9826569 | 6/1998 |
| WO | WO 9826584 | 6/1998 |
| WO | WO 9826596 | 6/1998 |
| WO | WO 9827723 | 6/1998 |
| WO | WO 9839893 | 9/1998 |
| WO | WO 9848566 | 10/1998 |
| WO | WO 9851076 | 11/1998 |
| WO | WO 9859493 | 12/1998 |
| WO | WO 9903267 | 1/1999 |
| WO | WO 9911065 | 3/1999 |
| WO | WO 9913471 | 3/1999 |
| WO | WO 9914947 | 3/1999 |
| WO | WO 9930491 | 6/1999 |
| WO | WO 9935831 | 7/1999 |
| WO | WO 9939280 | 8/1999 |
| WO | WO 9945700 | 9/1999 |
| WO | WO 9945702 | 9/1999 |
| WO | WO 9956466 | 11/1999 |
| WO | WO 9957904 | 11/1999 |
| WO | WO 9960783 | 11/1999 |
| WO | WO 9960789 | 11/1999 |
| WO | WO 9966719 | 12/1999 |
| WO | WO 0002380 | 1/2000 |
| WO | WO 0004706 | 1/2000 |
| WO | WO 0011869 | 3/2000 |
| WO | WO 0016548 | 3/2000 |
| WO | WO 0033560 | 6/2000 |
| WO | WO 0033565 | 6/2000 |
| WO | WO 0058834 | 10/2000 |
| WO | WO 0059214 | 10/2000 |
| WO | WO 0059223 | 10/2000 |
| WO | WO 0062299 | 10/2000 |
| WO | WO 0062533 | 10/2000 |
| WO | WO 0079798 | 12/2000 |
| WO | WO 0119086 | 3/2001 |
| WO | WO 0146843 | 6/2001 |
| WO | WO 0146869 | 6/2001 |
| WO | WO 0147238 | 6/2001 |
| WO | WO 0147249 | 6/2001 |
| WO | WO 0147257 | 6/2001 |
| WO | WO 0147273 | 6/2001 |
| WO | WO 0147279 | 6/2001 |
| WO | WO 0150743 | 7/2001 |
| WO | WO 0158158 | 8/2001 |
| WO | WO 03019932 | 3/2003 |
| WO | WO 03058537 | 7/2003 |
| WO | WO 03094134 | 11/2003 |
| WO | WO 2004063892 | 7/2004 |
| WO | WO 2004095426 | 11/2004 |

OTHER PUBLICATIONS

U.S. Appl. No. 09/437,304, dated Nov. 9, 1999, Boyer et al.
U.S. Appl. No. 09/492,713, dated Jan. 29, 2000, Forrer et al.
U.S. Appl. No. 10/105,128, dated Feb. 21, 2002, Ellis et al.
U.S. Appl. No. 10/347,673, dated Jan. 17, 2003, Knudson et al.
U.S. Appl. No. 10/927,814, dated Aug. 26, 2004, Ellis et al.
U.S. Appl. No. 11/179,410, dated Jul. 11, 2005, Ellis et al.
U.S. Appl. No. 11/324,202, dated Dec. 29, 2005, Yates.
Digital Video Broadcasting (DVB); DVB specification for data broadcasting, European Telecommunications Standards Institute, Draft EN 301 192 V1.2.1 (1999).
"Enhanced Content Specification", "ATVEF", from the Internet at http://www.atvef.com/library/spec.html, printed Aug. 22, 2001, the document bears a Copyright date of 1998, 1999, 2000.
"OpenTV Launches OpenStreamer™ Technology for Broadcasters to Deliver First Ever Real-Time Digital Interactive Television", from the Internet at http://www.opentv.com/news/openstreamer_press_final.htm, printed on Jun. 28, 1999, the document bears a copyright date of 1999.
"OpenTV(R) and Interactive Channel Form Strategic Alliance to Deliver Interactive Programming to Satellite Television Subscribers", from the Internet at http://www.opentv.com/news/interactivechannelfinal.htm, printed on Jun. 8, 1999.
Cramer C. et al, "Distributed Job Scheduling in a Peer-to-Peer Video Recording System" URL:http//i30www.ibds.uka.de/research/documents/p2p/2004/cramer04scheduling.pdf> [retrieved on May 5, 2004].
Curt Rogers, "Telcos vs. Cable TV: The Global View," Data Communications, No. 13, New York, pp. 75, 76, 78 and 80, Sep., 1995.
Electronic Programme Guide (EPG); Protocol for a TV Guide using electronic data transmission by European Telecommunication Standards Institute, May 1997, Valbonne, France, publication No. ETS 300 707.
Hartwig et al., "Broadcasting and Processing of Program Guides for Digital TV", SMPTE Journal, pp. 727-732, Oct. 1997.
Hofmann et al., "Videotext Programmiert Videorecorder," Rundfunktechnische Mitteilungen, Nov.-Dec. 1982, pp. 254-257.
Honey, is there anything good on the remote tonight?, advertisement from Multichannel News, Braodband Week Section, p. 168, Nov. 30, 1998.
How Evolve Works, from the Internet at http://www.evolveproducts.com/network.html, printed on Dec. 28, 1998.
Index Systems Inc., "Gemstar Service Object Model," Data Format Specification, Ver. 2.0.4 pp. 58-59. Dec. 20, 2002.

Jaidev, "EXSLT—A Wired and Wireless Case Study," http://csharpcomputing.com/XMLTutorial/Lessionl5.htm. Oct. 14, 2005.

Jini Architecture Overview, by Jim Waldo, from the Internet at http://Java.sun.com/products/jini/whitepapers/architectureoverview.pdf/ pinted on Jan. 25, 1999. The document bears a copyright date of 1998.

Machine Transcription of JP 08076778, Mar. 22, 1996.

Machine Transcription of JP 41016284, Jan. 22, 1999.

Miller, Matthew D., "A Scenario for the Deployment of Interactive Multimedia Cable Television Systems in the United States in the 1990's", proceedings of the IEEE, vol. 82, No. 4, Apr. 1994, pp. 585-589.

Papers Delivered (Part1), 61st National Conference, Information Processing Society of Japan, Oct. 3-5, 2000.

Pogue, D., "State of the Art: For TiVo and Replay, New Reach," N.Y. Times, May 29, 2003.

Prevue Networks and OpenTV(R) Agree to Work Together on Deploying Interactive Program Guides Worldwide, from the Internet at http://www.opentv.com/news/prevuefinal.htm, printed on Jun. 28, 1999.

Randerson, J., "Let Sofware Catch the Game for You," New Scientist, Jul. 3, 2004.

Reaching your subscribers is a complex andcostly process-until now, from the Internet at http://www.evolveproducts.com/info.html, printed on Dec. 28, 1998.

Rewind, replay and unwind with new high-tech TV devices, by Lawrence J. Magid, LA Times. This document was printed from the Internet on Jun. 6, 1999 and bears a date of May 19, 1999.

Sun's Next Steps in Digital Set-Tops, article in Cablevision, p. 56, Nov. 16, 1998.

Technical White Paper, "OpenTV™ Operating Environment", (©1998 OpenTV Inc.), pp. 1-12.

The Evolve EZ Guide. The Remote. Control, from the Internet at http://www.evolveproducts.com/display2.html, printed on Dec. 28, 1998.

Using Starsight 2, published before Apr. 19, 1995.

Verknüpfung von TV mit Internet, Forschung & Entwicklung, vol. 68, No. 18, 16 Aug. 1996, pp. 70-71, XP000631189.

Von Andreas Neumann, "WDR Online Aufbau Und Perspektiven Automatisierter Online-Dienste Im WDR," Rundfunktechnische Mitteilungen, vol. 41, pp. 56-66, Jun., 1997.

Von Gerhard Eitz, "Zukunftige Informations-Und Datenangebote Beim Digitalen Fernsehen-EPG Und "Lesezeichen"," Rundfunktechnische Mitteilungen, vol. 41, pp. 76-72, Apr. 30, 1997.

What is Jini?, from the Internet at http://java.sun.com/products/jini/whitepapers/whatsjini.pdf, printed on Jan. 25, 1999.

Why Jini Now?, from the internet at http://java.sun.com/products/jini/whitepapers/whyjininow.pdf, printed on Jan. 25, 1999. The document bears a copyright date of 1998.

Windows 98 Feature Combines TV, Terminal and the Internet, New York Times, Aug. 18, 1998.

Office Actions and Corresponding Replies in relation to U.S. Appl. No. 11/442,670, filed Jun. 4, 2010.

Office Actions and Corresponding Replies in relation to European Patent Application No. 04075877.3, Apr. 3, 2009.

* cited by examiner

| CHANNEL NUMBER | SOURCE ID | AVAILABLE | BLOCKED OUT | START TIME | END TIME |
|---|---|---|---|---|---|
| 2 | 1000 | Y | N | 0000 | 2400 |
| 3 | 1015 | Y | N | 0000 | 2400 |
| 4 | 1018 | Y | Y | 0000 | 2400 |
| 5 | 1111 | N | N | 0000 | 2400 |
| 6 | 1050 | Y | N | 0000 | 1200 |
| 6 | 1075 | Y | N | 1200 | 2400 |
| ... | ... | ... | ... | ... | ... |
| 99 | 1032 | Y | N | 0000 | 2400 |

FIG. 10

| SOURCE ID | NETWORK ID | START TIME | END TIME |
|---|---|---|---|
| 1000 | 2001 | 0000 | 2400 |
| 1015 | 2000 | 0000 | 2400 |
| 1018 | 2000 | 0000 | 2400 |
| 1111 | 2055 | 0000 | 2400 |
| 1050 | 2010 | 0000 | 0600 |
| 1050 | 2020 | 0600 | 2400 |
| 1075 | 2001 | 0000 | 2400 |
| ... | ... | ... | ... |
| 1032 | 2165 | 0000 | 2400 |

FIG. 11

| CHANNEL NUMBER | SOURCE ID | NETWORK ID | NETWORK AVAILABLE | BLOCKED OUT | START TIME | END TIME |
|---|---|---|---|---|---|---|
| 2 | 1000 | 2001 | Y | N | 0000 | 2400 |
| 3 | 1015 | 2000 | Y | N | 0000 | 2400 |
| 4 | 1018 | 2000 | Y | Y | 0000 | 2400 |
| 5 | 1111 | 2055 | N | N | 0000 | 2400 |
| 6 | 1050 | 2010 | Y | N | 0000 | 0600 |
| 6 | 1050 | 2020 | Y | N | 0600 | 1200 |
| 6 | 1075 | 2000 | Y | N | 1200 | 2400 |
| ••• | ••• | ••• | ••• | ••• | ••• | ••• |
| 99 | 1032 | 2165 | Y | N | 0000 | 2400 |

FIG. 12

PROGRAM GUIDE

ADVERTISEMENT

| CH/TIME | 7:00 pm | 7:30 pm | 8:00 pm | 8:30 pm | 9:00 pm | 9:30 pm |
|---|---|---|---|---|---|---|
| 2 | PROGRAM 1 | | | PROGRAM 2 | | |
| 3 | PROGRAM 3 | | PROGRAM 4 | | PROGRAM 5 | |
| 4 | PROGRAM 6 | PROGRAM 7 | PROGRAM 8 | PROGRAM 9 | PROGRAM 10 | PROGRAM 11 |
| 5 | PROGRAM 12 | PROGRAM 13 | PROGRAM 14 | | PROGRAM 15 | |
| 6 | PROGRAM 16 | | | PROGRAM 17 | | |
| 7 | PROGRAM 18 | | | | PROGRAM 19 | |
| 8 | PROGRAM 20 | | PROGRAM 21 | | PROGRAM 22 | |
| 9 | PROGRAM 23 | PROGRAM 24 | PROGRAM 25 | PROGRAM 26 | PROGRAM 27 | |
| 10 | PROGRAM 28 | | PROGRAM 29 | | PROGRAM 30 | |
| 11 | PROGRAM 31 | | PROGRAM 32 | | PROGRAM 33 | |

FIG. 16

SYSTEMS AND METHODS FOR ADVERTISING TELEVISION NETWORKS, CHANNELS, AND PROGRAMS

CROSS REFERENCE TO RELATED APPLICATIONS

This application is a continuation of U.S. patent application Ser. No. 10/783,150, filed Feb. 19, 2004 which is a continuation of U.S. patent application Ser. No. 09/217,100, filed Dec. 16, 1998, which claims the benefit of United States Provisional Patent Application No. 60/085,608, filed May 15, 1998, each of which are hereby incorporated by reference herein in their entireties.

BACKGROUND OF THE INVENTION

This invention relates to television advertising, and, more particularly, to techniques for advertising television networks, channels, and programs.

The practice of advertising television networks, channels, and programs has become widespread. For example, an advertisement for a network or channel may promote the network or channel generally or a particular line-up of television programs on that network or channel. Similarly, an advertisement for a television program may promote the program generally or a particular episode or particular episodes of that program.

Advertisements for television networks, channels, and programs have been delivered to television viewers in a variety of ways. For example, advertisements have been delivered by using standard television commercial time slots in television programs to present the advertisements to television viewers. The advertisements delivered in such standard television commercial time slots for television networks and channels have been delivered on both the same and different networks and channels from those being advertised. Similarly, the advertisements for television programs delivered in standard television commercial time slots have been delivered during both the same and different television programs from those being advertised.

As another example, barker television screens have also been used to present advertisements to television viewers over channels that are otherwise unused by television systems. The advertisements delivered on such barker television screens have been presented in a variety of formats including full motion video (including audio), still images, graphics, and text.

As yet another example, passive program guides that provide television program information to television viewers on dedicated television channels have been used to present advertisements. More recently, interactive television program guides have been developed that are similarly capable of delivering advertising for various types of programming. The advertisements delivered by such passive and interactive program guides have been presented in a variety of formats including full motion video (including audio), still images, graphics, and text.

A problem with television advertising is that in certain circumstances the advertisement for a network, channel, or program may be wasted if the network, channel, or program is unavailable to or undesired by a television viewer. For example, an advertisement presented to a viewer of a news channel for a comedy channel may be wasted if the comedy channel is unavailable to the viewer. As another example, an advertisement for an adult television channel may be wasted when presented to a television viewer who has opted to block out the programming available on the adult television channel in the viewer's home.

As yet another example, an advertisement for a program on a network may be wasted if the local affiliate for that network has chosen not to present the advertised program. As still another example, where a channel on a television system is split by the system operator between a first programming provider during one portion of the day and a second programming provider during another portion of the day, an advertisement for a program provided by the first programming provider may be wasted if the program is to be aired during the second programming provider's portion of the day. As a further example, where a channel produced by a programming provider is affiliated with a first network during one portion of the day and a second network during another portion of the day, an advertisement for a program on the first network may be wasted if the program is to be aired during the second network's portion of the day.

Rather than wasting an advertising opportunity by presenting an advertisement for a network, channel, or program that is unavailable to or undesired by a television viewer, it may be preferred to present an advertisement for a network, channel, or program that is available to or desired by a television viewer, or some other advertisement.

A problem associated with providing television advertising in program guides is that in order to present an advertisement for a network or a program to be aired on a network, a separate copy of the advertisement for each of the affiliates of the network must be broadcast to the television systems in which the advertisement is to be aired. This repetitive broadcasting must be performed so that each television system receives a copy of the advertisement that is associated with the affiliate of the advertised network carried by the television system. Because the size of typical advertisements that contain graphics may be on the order of several kilobytes, however, broadcasting a separate copy of the advertisement for each affiliate of large networks may be inefficient. For example, for a program guide advertisement having a size of six kilobytes that is to be advertised in association with a network having three hundred affiliates, the broadcasting of that advertisement alone would require the broadcasting of one thousand, eight hundred kilobytes of data.

It is therefore an object of the present invention to provide systems and methods for advertising television networks, channels, and programs that prevent advertisements from being displayed for networks, channels, and programs that are unavailable to television viewers.

It is also an object of the invention to provide systems and methods for advertising television networks, channels, and programs that prevent advertisements from being displayed for networks, channels, and programs that are undesired by television viewers.

It is a further object of the invention to provide systems and methods for advertising television networks, channels, and programs that prevent advertisements of network programs from being displayed when those programs are not aired by the local affiliates of the corresponding networks.

It is a yet further object of the invention to provide systems and methods for advertising television networks, channels, and programs that prevent advertisements of programs from being displayed when those programs are to be aired during a portion of the day when the program provider or network associated with the program is not available to television viewers.

It is a still further object of the invention to provide systems and methods for advertising television networks, channels, and programs that do not require the repetitive broadcasting, for each affiliate of a network, of advertisements for that network, or a program to be aired on that network, to those television systems carrying the advertisements.

SUMMARY OF THE INVENTION

These and other objects of the invention are accomplished in accordance with the principles of the invention by providing systems and methods that control the presentation of advertisements to television viewers based upon the networks, channels, and programs which are available to the viewers and based upon whether those networks, channels, and programs are indicated by the viewers to be undesirable. Additionally, in preferred embodiments of these systems and methods, only a single broadcast of each advertisement that is associated with a network (or a program on a network) and a network identifier is performed for all television systems. Once received, the network identifier is used to determine whether the advertisement is to be presented to the viewers of each television system.

The systems and methods of the present invention preferably control the presentation of advertisements by determining at television viewer equipment whether the advertisements are associated with television networks, channels, or programs that may be unavailable to the television viewer or that may be undesirable to the television viewer. Once this determination has been made, the television viewer equipment then preferably presents the advertisements, or selects and presents suitable alternative advertisements. Advertisements may be presented using any suitable technique such as by presenting full motion video (including audio), still images, graphics, and text, during standard television commercial time slots, on barker screens, in passive or interactive program guide advertisements, or using any other suitable advertising method.

The television viewer equipment of the systems and methods of the present invention is preferably a television set-top box coupled to a television, although videocassette recorders (VCRs), advanced television receivers, personal computer televisions (PC/TVS), and any other suitable equipment that has sufficient hardware to perform the same processing and display functions provided by a television set-top box and television may also be used.

The television viewer equipment preferably receives transmissions of data such as advertisements and advertisement control information, program guide information, and channel map information from a main facility, a television distribution facility, or network nodes within a television system. At the television viewer equipment, this data may be used by an interactive television program guide or other suitable application, possibly with additional data stored in the television viewer equipment (such as channel block-out information), to determine whether an advertisement is to be presented to the television viewer.

For example, the program guide or other application may determine that an advertisement that was intended to be presented on the channel "CNN" for a program to be aired on the channel "WTBS" is not to be presented if "WTBS" is not available in the television system, even though "CNN" is available. In this example, it may be determined that the advertisement is associated with "WTBS" from advertisement control information that accompanies the advertisement, or by searching for the program being advertised in program guide information stored in the television viewer equipment and retrieving the corresponding channel information. The determination that "WTBS" is unavailable to the viewer may be made by consulting channel map information stored in the television viewer equipment or by referring to channel information in program guide information stored in the television viewer equipment. Finally, once the determination of whether the advertisement is to be presented has been made, the advertisement can be presented to the television viewer or a suitable alternative advertisement can be identified and presented.

In order to avoid redundantly broadcasting an advertisement that is associated with a network (or a program to be aired on a network) to each television system carrying the advertisement for each affiliate of that network, the advertisement and a network identifier are preferably broadcast only once to all television viewer equipment in the television systems. The advertisement and the network identifier are received at the television viewer equipment. Using the network identifier and channel map or program guide information located in the television viewer equipment, an interactive program guide or other application running in the television viewer equipment determines whether a local affiliate for that network is available and has not been designated as undesirable by a television viewer. If the local affiliate is available and has not been designated as undesirable, the advertisement is presented to the television viewer. If a local affiliate for that network is not available or the only local affiliate available for that network has been designated as undesirable by the television viewer, a suitable alternative advertisement is identified and presented to the television viewer.

Further features of the invention, its nature and various advantages will be more apparent from the accompanying drawings and the following detailed description of the preferred embodiments.

BRIEF DESCRIPTION OF THE DRAWINGS

FIG. 10 is a chart of a channel map relating channel numbers, source identification numbers, availability flags, blocked-out flags, and start and end times in accordance with one embodiment of the present invention.

FIG. 11 is a chart of a channel map relating source identification numbers, network identification numbers, and start and end times in accordance with one embodiment of the present invention.

FIG. 12 is a chart of a channel map relating channel numbers, source identification numbers, network identification numbers, availability flags, blocked-out flags, and start and end times in accordance with one embodiment of the present invention.

FIG. 16 is a depiction of a "grid" interactive program guide display screen showing an advertisement area for presenting advertisements in accordance with one embodiment of the present invention.

DETAILED DESCRIPTION OF THE PREFERRED EMBODIMENTS

Figure 1:
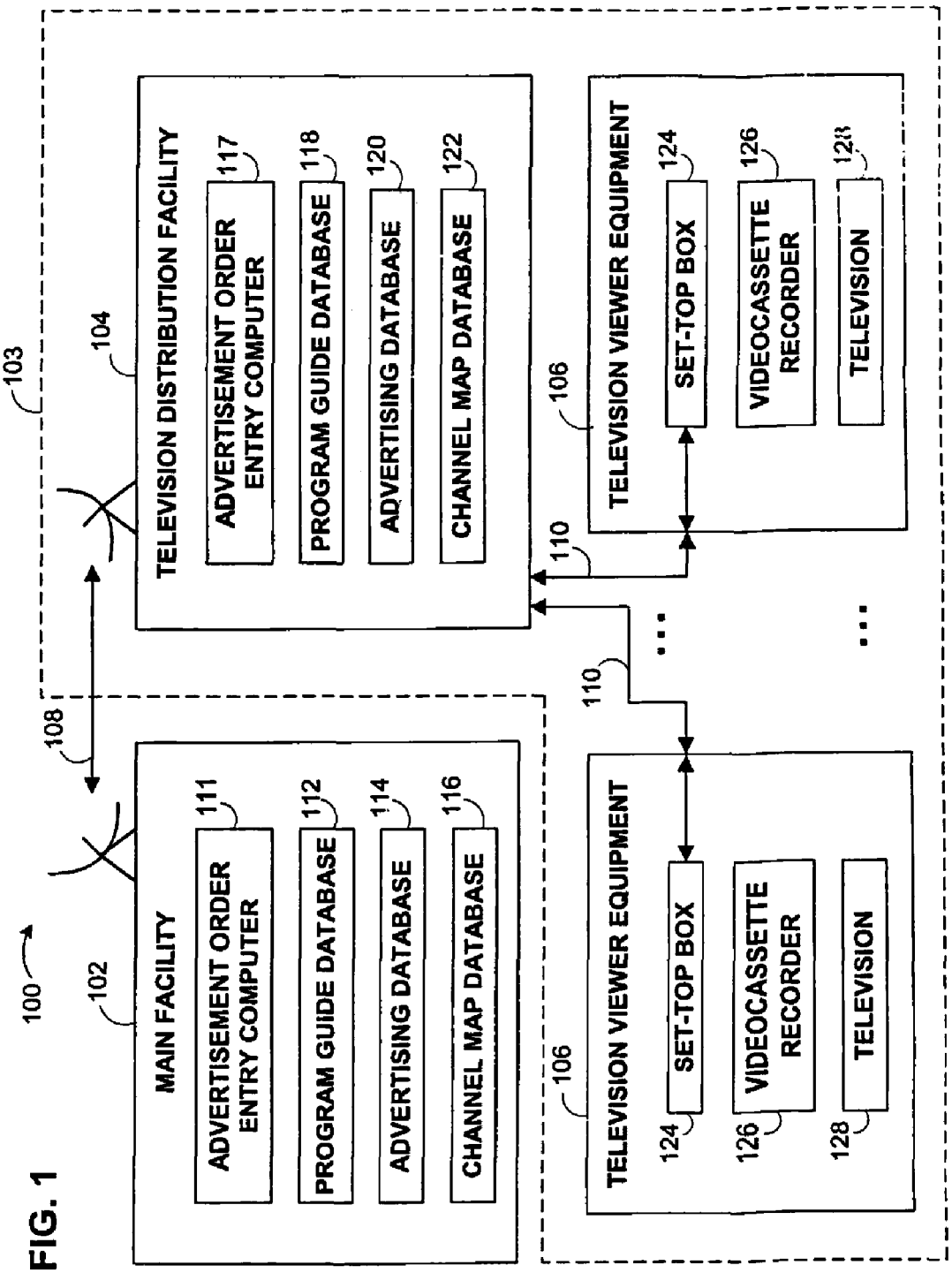
FIG. 1 is a diagram of a system in which systems and methods for targeting of advertising based on network, channel, and program availability and desirability may be implemented in accordance with one embodiment of the present invention.

An illustrative system 100 for controlling the presentation of advertisements associated with television networks, channels, and programs in accordance with the present invention is shown in FIG. 1. System 100 preferably includes a main facility 102 and a plurality of communications links 108 and television systems 103. Only one such communications link 108 and television system 103 are shown in FIG. 1 to avoid over complicating the drawing. Each television system 103 includes at least one television distribution facility 104, communications path 110, and piece of television viewer equipment 106. Generally speaking, main facility 102 provides central data storage and control for some of the program guide functions associated with system 100. System 100 typically has a very large geographical area. Each communications link 108 transmits data between main facility 102 and one or preferably more television distribution facilities 104. Television distribution facilities 104 may provide local data storage and control for typically more localized geographical areas within system 100. Each communications path 110 transmits data between a television distribution facility 104 and one or more pieces of television viewer equipment 106. And each piece of television viewer equipment 106 controls the presentation of advertisements (e.g., on a viewer's television).

Main facility 102 provides central storage and control of program guide data, advertising data, and channel map data in system 100. In order to do so, main facility 102 preferably contains, among other things, an advertisement order entry computer 111, a program guide database 112, an advertising database 114, and a channel map database 116. Advertisement order entry computer 111 preferably enables and controls the placing of orders for the presentation of advertisements in system 100. When an order is placed via computer 111, computer 111 may accept advertisement control information identifying which advertisement is to be presented, the network, channel, or program with which the advertisement is associated, the date, time, and channel on which the advertisement is to be presented, etc. Once this information has been entered, computer 111 may package and store the advertisement and the advertisement control information in advertising database 114 for later transmission. Computer 111 may also package and store a substitute advertisement (that may be a generic advertisement having no correlation to the primary advertisement and that may be presented instead of the primary advertisement) with the advertisement and the advertisement control information. Computer 111 may be implemented using a personal computer, a mainframe computer, a network of computers, or any other suitable computer capable of receiving and processing data, and communicating with advertising database 114.

Program guide database 112 preferably includes television program guide information such as program times, channels, titles, descriptions, pricing information for individual pay programs and subscription channels, time windows for ordering pay programs and channels, telephone numbers for placing orders for pay programs and channels, etc. Advertising database 114 preferably includes advertisements in forms such as text, graphics, video, and audio data, advertisement control information such as presentation date, time (including time ranges and correction data), and length information, presentation channel and network information, and information such as the names, categories, ratings, descriptions, and series for the networks, channels, and programs being advertised. Channel map database 116 preferably includes channel map information relating the channels, networks, and sources of programming that can be received in system 100 and may also indicate what channels are available to viewers. For example, the channel map information may indicate that channel number "2" is related to the Central Broadcasting System ("CBS") network and is provided by affiliate "WCBS" in New York City. The channel map information may further include day and time information indicating the days and times at which channels change source or network associations. Although databases 112, 114, and 116 are each illustrated in FIG. 1 as unique databases in main facility 102, any or all of databases 112, 114, and 116 could be consolidated together in, or omitted from, main facility 102 or located at separate main facilities 102.

Information from databases 112, 114, and 116 may be transmitted to each television distribution facility 104 by way of communications link 108. Link 108 may be a satellite link, a telephone network link, a cable or fiber optic link, a microwave link, a combination of such links, or any other suitable communications link. The information transmitted by way of communications link 108 may be transmitted using any suitable transmission technique.

Each television distribution facility 104 is a facility, such as a cable system headend, a broadcast distribution facility, or a satellite television distribution facility, for distributing television signals and data to television viewer equipment 106. As illustrated, each television distribution facility 104 may include, among other things, an advertisement order entry computer 117, a program guide database 118, an advertising database 120, and a channel map database 122. Advertisement order entry computer 117 may be substantially the same as advertisement order entry computer 111 in main facility 102. Each of databases 118, 120, and 122 may be substantially the same as databases 112, 114, and 116 in main facility 102, may provide local mirrors of the data in those databases and may be omitted from television distribution facility 104 or located in separate television distribution facilities 104.

If desired, some or all of the program guide information, advertisements and advertisement control information (including that received from advertising order entry computers 111 and 117), and channel map information in databases 112, 114, 116, 118, 120, and 122 may be provided using data sources at facilities other than main facility 102 and television distribution facility 104. For example, program guide information for all or a portion of system 100 may be maintained by a program guide information provider that is separate from main facility 102 and television distribution facility 104. Similarly, advertisements and advertisement control information may be generated by an advertising facility that is separate from main facility 102 and television distribution facility 104. Also, the channel map information in databases 112, 114, 116, 118, 120, and 122 may be generated and maintained locally at television distribution facility 104.

Program guide information, advertisements, advertisement control information, and channel map information is distributed from television distribution facility 104 to television viewer equipment 106 by way of communications paths 110. Communications paths 110 may be satellite links, telephone network links, cable or fiber optic links, microwave or other free-space links, combinations of such links, or any other suitable communications paths. Any suitable technique or combination of techniques may be used to transmit program guide information, advertisements, advertisement control information, and channel map information over communications paths 110 including analog transmission, digital transmission, and mixed analog and digital transmissions.

Preferably, communications paths 110 have sufficient bandwidth to allow television distribution facility 104 to distribute television programming such as standard broadcast television, pay programming, advertising and promotional videos, and other video information to television viewer equipment 106. Multiple television and audio channels (analog, digital, or both analog and digital) may be provided by communications paths 110. Program guide information, advertisements, advertisement control information, and channel map information may be transmitted through communications paths 110 using out-of-band channels, using in-band digital channels, using the vertical blanking interval, or using any other suitable technique. If desired, program guide information, advertisements, advertisement control information, and channel map information may be distributed by one or more distribution facilities that are similar to, but separate from, main facility 102 and television distribution facility 104 using communications paths that are the same or separate from communications paths 110.

The information stored and transmitted by databases 112, 114, 116, 118, 120, and 122 preferably ultimately reaches television viewer equipment 106 where the information is processed and displayed (e.g., by an interactive program guide application or by another suitable application) as necessary. As shown, each piece of television viewer equipment 106 may include a set-top box 124, a videocassette recorder 126, and a television 128. Television viewer equipment 106 may additionally or alternatively include advanced television receivers, personal computer televisions (PC/TVS), and any other suitable equipment that has sufficient hardware to perform the same processing and display functions provided by a set-top box and television. Preferably, the information from databases 112, 114, 116, 118, 120, and 122 is processed and transformed into a displayable signal by suitable hardware and software incorporated into set-top box 124, although this hardware could alternatively be incorporated into videocassette recorder 126 or television 128.

The distribution of data from databases 112, 114, 116, 118, 120, and 122 may be accomplished using one-way transmission from some or all of the databases to television viewer equipment 106. For example, data may be distributed to television viewer equipment 106 continually or periodically from some or all of databases 112, 114, 116, 118, 120, and 122. The distribution of data may also be accomplished using two-way transmissions. With this approach, television viewer equipment 106 requests the needed data from the databases, and, in response, the corresponding database transmits back the requested data.

Figure 2:
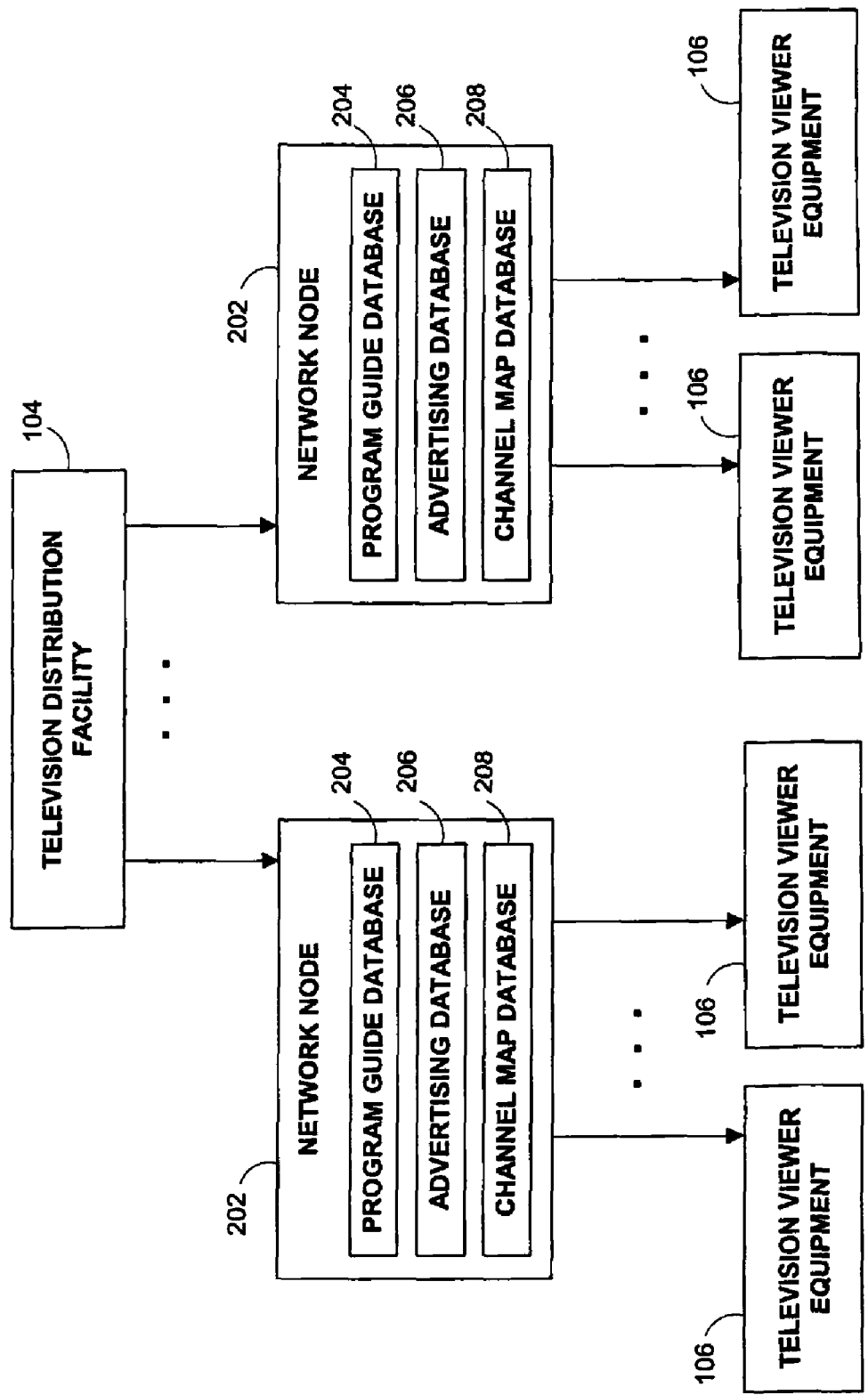
FIG. 2 is a diagram of a system similar to the system in FIG. 1 showing how servers may be located at network nodes in accordance with one embodiment of the present invention.

As shown in FIG. 2, the capabilities of databases 112, 114, 116, 118, 120, and 122 may be provided using databases 204, 206, and 208 located at network nodes 202 which may be located throughout system 100. Databases such as databases 204, 206, and 208 may be used instead of some or all of databases 112, 114, 116, 118, 120, and 122 and may be used in conjunction with some or all of databases 112, 114, 116, 118, 120, and 122. By providing databases at network nodes 202 rather than or in addition to databases provided at main facility 102 and television distribution facility 104, it may be possible to focus the data maintained for a particular area serviced by each network node 202 and it may be possible to more rapidly deliver responses to data requests from television viewer equipment 106 in two-way transmission systems.

Figure 3:
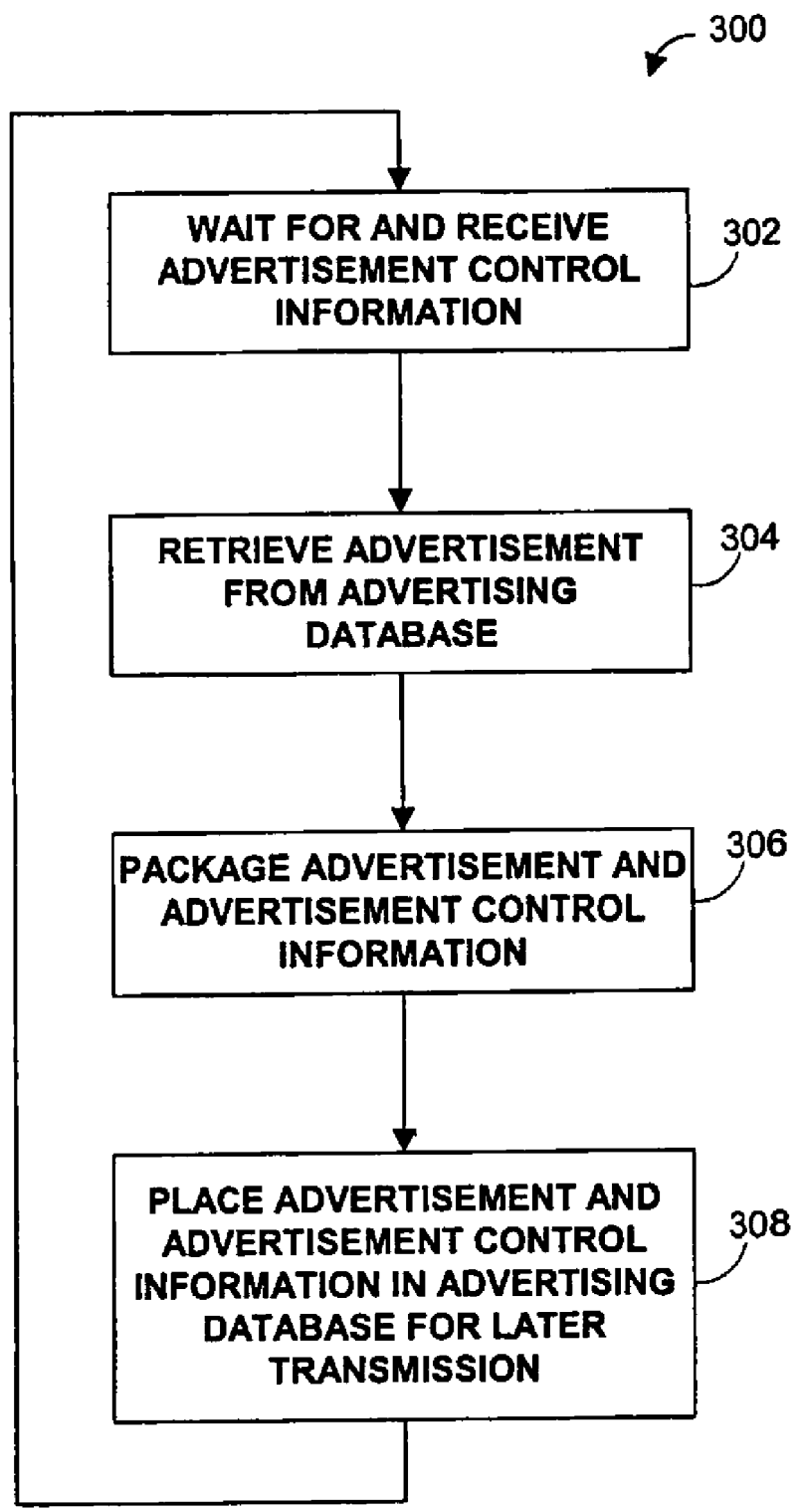
FIG. 3 is a flow chart of steps involved in receiving and processing an order for an advertisement at an order entry computer in accordance with one embodiment of the present invention.

A process 300 for enabling and controlling the placing of orders for advertisements that may be implemented on advertising order entry computers 111 (FIG. 1) and 117 (FIG. 1) is illustrated in FIG. 3. At step 302, process 300 begins by waiting for and receiving advertisement control information from a user. As mentioned above in connection with the discussion of advertisement order entry computer 111 of FIG. 1, this information may include an indicator of the advertisement to be presented, the network, channel, or program with which the advertisement is associated, the date, time, and channel on which the advertisement is to be presented, etc. Personnel at main facility 102 or television distribution facility 104 may enter the advertisement control information directly into computers 111 or 117, or the information may be received by computers 111 or 117 by way of any suitable intermediate computer system. During normal operation, advertisements are retrieved from one of advertising databases 114, 120, or 206 at step 304 based oh the advertisement control information. The advertisements and advertisement control information are then packaged in preparation for transmission to television viewer equipment 106 at step 306. A substitute advertisement (that may or may not be correlated to the primary advertisement) may also be retrieved from one of databases 114, 120, or 206 at step 304 and packaged for transmission along with the primary advertisement and advertisement control information at step 306, if desired. For an advertisement associated with television networks, this packaging in step 306 may include setting a network identification number in the advertisement control information so that television systems 103 receiving the advertisement may determine if an affiliate associated with the network is carried by each television system 103. Finally, the advertisement and advertisement control information (and substitute advertisement, if desired) are placed in an advertising database 114, 120, or 206 for later transmission to television viewer equipment 106 at step 308. Once step 308 has been performed, process 300 loops back to step 302 to wait for and receive more advertisement control information.

Figure 4:
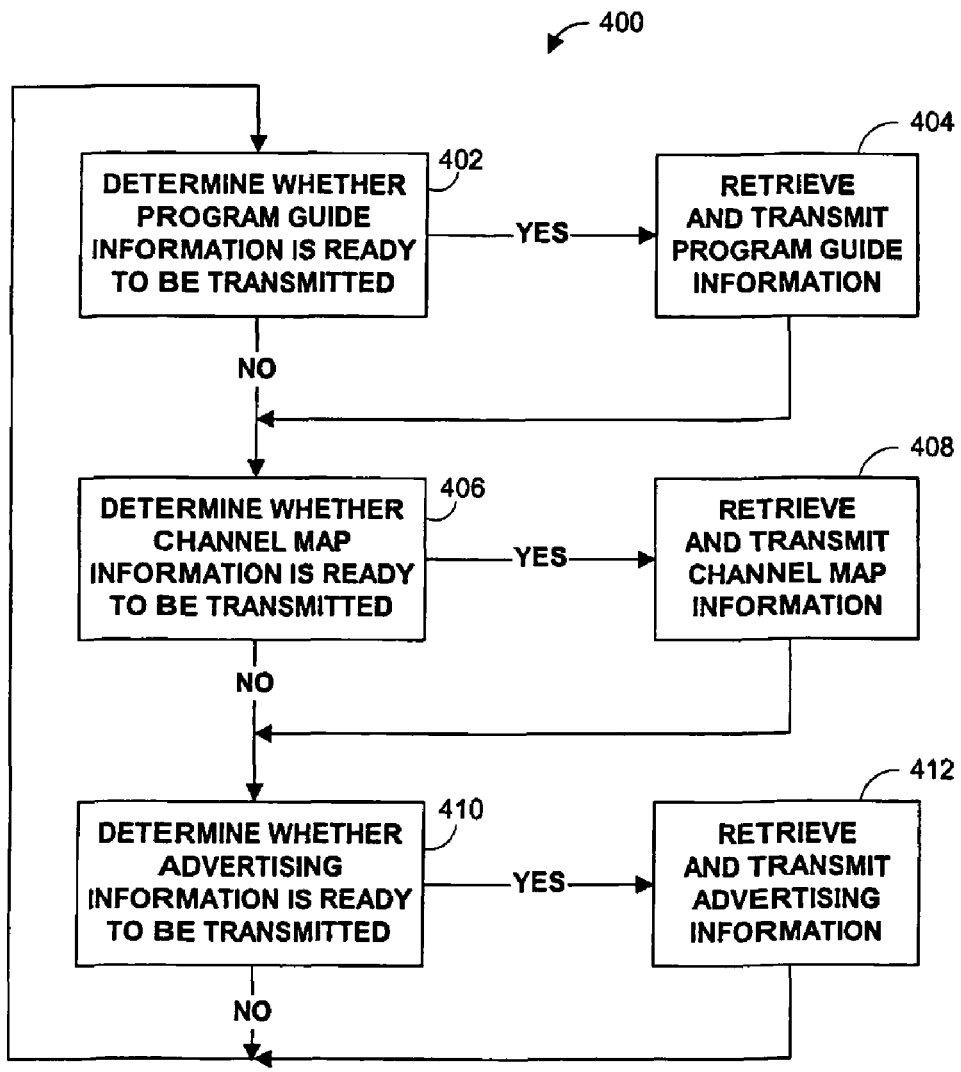
FIG. 4 is a flow chart of steps involved in transmitting program guide information, channel map information, and advertising information from corresponding databases in accordance with one embodiment of the present invention.

FIG. 4 shows a process 400 for controlling the transmission of data to television distribution facilities 104, network nodes 202, and television viewer equipment 106, from databases 112, 114, 116, 118, 120, 122, 204, 206, and 208. Process 400 may be implemented by any of advertisement order entry computers 111 or 117, by databases 112, 114, 116, 118, 120, 122, 204, 206, or 208 (either by individually performing a portion of process 400 or by performing the entire process as a supervisor to the remaining co-located databases), by a transmitting end of communications link 108, by a transmitting end of communications paths 110, or by any other suitable equipment capable of controlling the transmission of data from databases 112, 114, 116, 118, 120, 122, 204, 206, and 208.

At step 402, process 400 begins by determining whether program guide information is ready to be transmitted from any of databases 112, 118, or 204. If it is determined at step 402 that television program guide information is ready to be transmitted, process 400 then retrieves and transmits the appropriate television program guide information at step 404. Once the information has been transmitted at step 404 or if it is determined at step 402 that no television program guide information is ready to be transmitted, process 400 determines whether channel map information is ready to be transmitted from any of databases 116, 122, or 208. If it is determined at step 406 that channel map information is ready to be transmitted, process 400 retrieves and transmits the appropriate channel map information at step 408. Once the information has been transmitted at step 408 or if it is determined at step 406 that no channel map information is ready to be transmitted, process 400 determines at step 410 whether advertising information is ready to be transmitted from any of databases 114, 120, or 206. Advertising information may include an advertisement and advertisement control information (and a substitute advertisement, if desired). If it is determined at step 410 that advertising information is ready to be transmitted, process 400 then retrieves and transmits the appropriate advertising information at step 412. Once the information has been transmitted at step 412 or if it is determined at step 410 that no advertising information is ready to be transmitted, process 400 loops back to and repeats step 402. If desired, the steps of FIG. 4 may be performed concurrently or in a different order.

Figure 5:
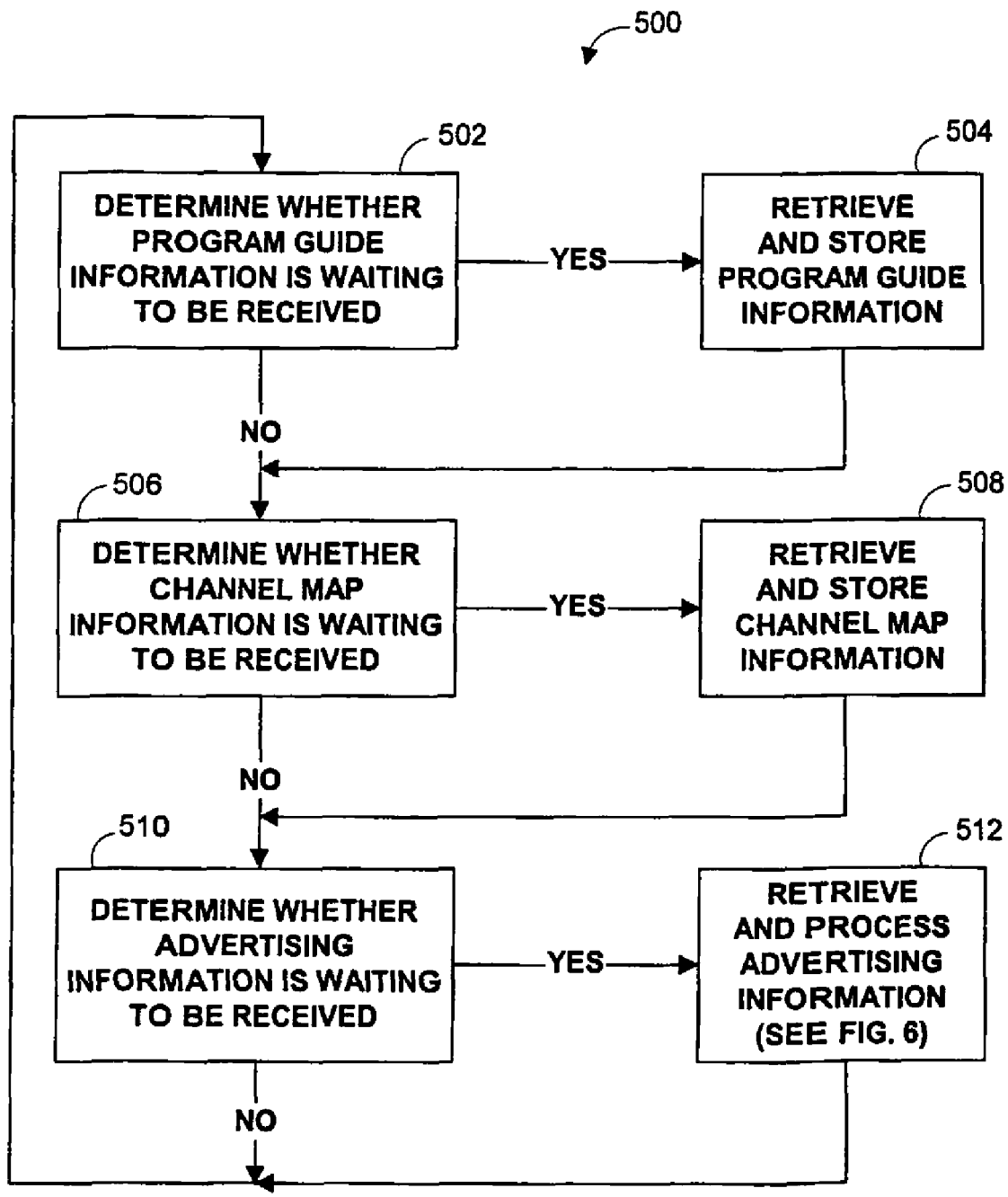
FIG. 5 is a flow chart of steps involved in receiving and storing or processing transmissions of program guide information, channel map information, and advertising information in accordance with one embodiment of the present invention.

FIG. 5 shows a process 500 for controlling the reception of data transmitted from databases 112, 114, 116, 118, 120, 122, 204, 206, and 208 to television distribution facilities 104, network nodes 202, or television viewer equipment 106. Process 500 is preferably implemented by a processor in television viewer equipment 106, but may also be implemented by a processor in advertisement order entry computer 117, in databases 118, 120, 122, 204, 206, or 208 (either by individually performing a portion of process 500 or by performing the entire process as a supervisor to the remaining co-located databases), in a receiving end of communications link 108, in a receiving end of communications paths 110, or in any other suitable equipment capable of controlling the reception of data from databases 112, 114, 116, 118, 120, 122, 204, 206, and 208 at television distribution facilities 104, network nodes 202, and television viewer equipment 106.

At step 502, process 500 begins by determining whether program guide information is waiting to be received from any of databases 112, 118, or 204. If it is determined at step 502 that program guide information is ready to be received, process 500 then receives and stores in memory the program guide information at step 504. When the program guide information is received at a television distribution facility 104 or a network node 202, instead of being stored in memory, the information may be stored in program guide database 118 or 204, respectively. Once the information has been stored at step 504 or if it is determined at step 502 that no program guide information is waiting to be received, process 500 determines at step 506 whether channel map information is waiting to be received from any of databases 116, 122, or 208. If it is determined at step 506 that channel map information is waiting to be received, process 500 then receives and stores in memory the channel map information at step 508. When the channel map information is received at a television distribution facility 104 or a network node 202, instead of being stored in memory, the information may be stored in channel map database 122 or 208, respectively.

Once the channel map information has been received at step 508 or if it is determined at step 506 that no channel map information is waiting to be received, process 500 determines at step 510 whether advertising information is waiting to be received from any of databases 114, 120, or 206. Advertising information may include an advertisement and advertisement control information (and a substitute advertisement, if desired). If it is determined at step 510 that advertising information is ready to be received, process 500 then receives and processes the advertising information at step 512. The receiving and processing of advertising information is further illustrated in FIGS. 6-9 and discussed below. As is discussed in connection with FIGS. 6-9, the manner in which the advertising information is processed, displayed (if at all), and stored (if at all), may be a function of the program guide information and channel map information that has been received (if at all) by process 500 at the time the advertising information is received. When the advertising information is received at a television distribution facility 104 or a network node 202, instead of being processed, the information may be stored in advertising database 120 or 206, respectively. Once the information has been processed or stored at step 512 or if it is determined at step 510 that no advertising information is waiting to be received, process 500 then loops back to and repeats step 502. If desired, the steps of FIG. 5 may be performed concurrently or in a different order.

Figure 6:
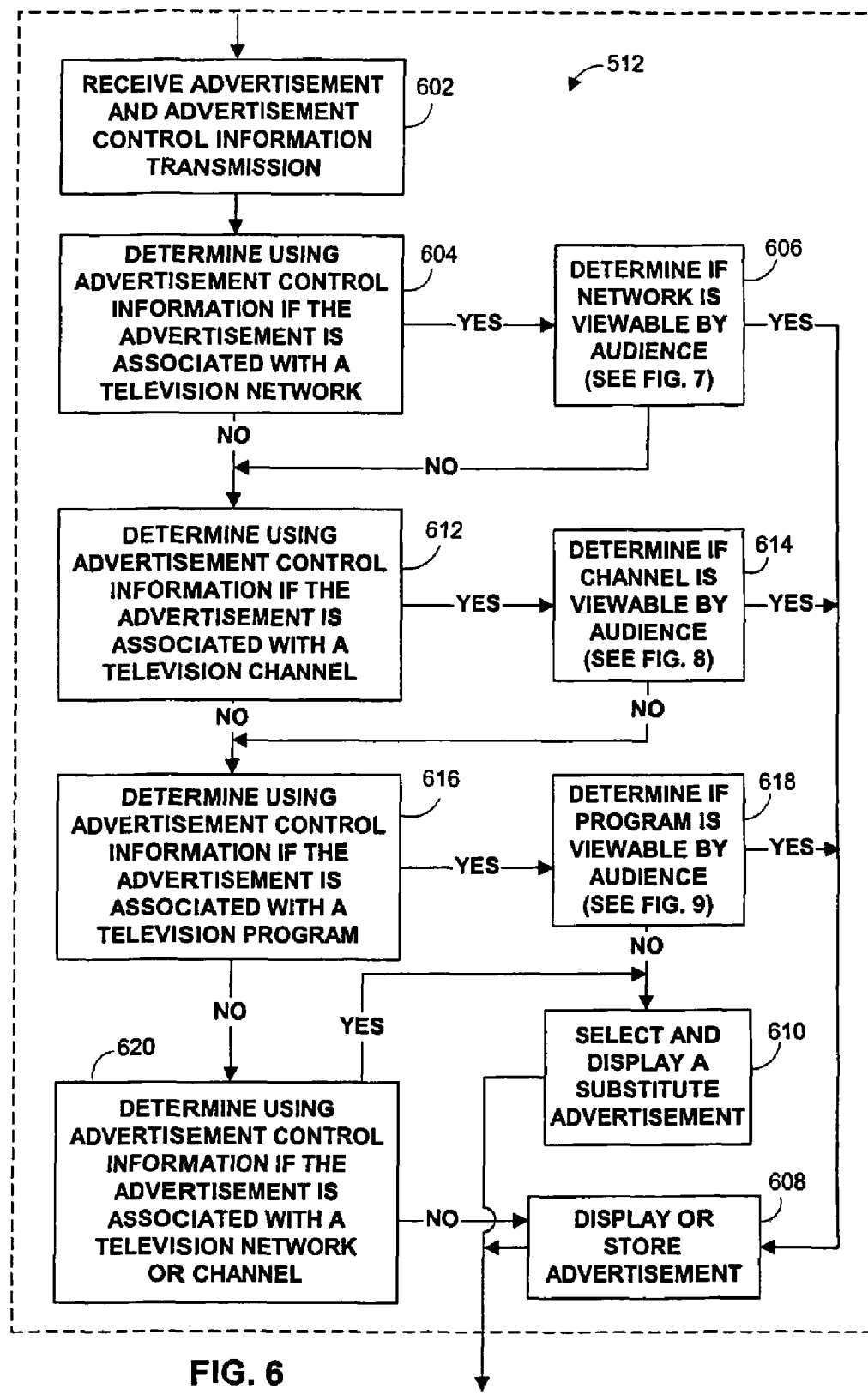
FIG. 6 is a flow chart of steps involved in receiving, processing, and displaying advertising information in accordance with one embodiment of the present invention.

FIG. 6 illustrates in more detail the receiving and processing of advertising information as performed in step 512 of FIG. 5. As shown, advertising information is received at step 602 as an advertisement and advertisement control information (and a substitute advertisement, if desired). Then at step 604 it is determined using the advertisement control information whether the received advertisement is associated with a television network. If it is determined at step 604 that the advertisement is associated with a television network, it is then determined at step 606 whether the network is viewable by the audience for the advertisement. The audience for the advertisement may be viewers of a single piece of television viewer equipment 106, viewers of all television viewer equipment 106 connected to a television distribution facility 104, etc. An example of how step 606 may be performed is discussed below in connection with the illustration of FIG. 7. If it is determined at step 606 that the network is viewable by the audience, the advertisement is displayed or stored at step 608, and then step 512 is completed.

If it is determined in step 604 that the received advertisement is not associated with a television network or in step 606 that the network is not viewable by the audience, it is then determined at step 612 using the advertisement control information whether the received advertisement is associated with a television channel. If it is determined at step 612 that the advertisement is associated with a television channel, it is determined at step 614 whether the channel is viewable by the audience for the advertisement. An example of how step 614 may be performed is discussed below in connection with the illustration of FIG. 8. If it is determined at step 614 that the channel is viewable by the audience, the advertisement is displayed or stored at step 608, and step 512 is completed.

If it is determined in step 612 that the received advertisement is not associated with a television channel or in step 614 that the channel is not viewable by the audience, it is then determined at step 616 using the advertisement control information whether the received advertisement is associated with a television program. If it is determined at step 616 that the advertisement is associated with a television program, it is then determined at step 618 whether the program is viewable by the audience for the advertisement. An example of how step 618 may be performed is discussed below in connection with the illustration of FIG. 9. If it is determined at step 618 that the program is viewable by the audience, the advertisement is displayed or stored at step 608, and step 512 is completed. Otherwise, if it is determined at step 618 that the program is not viewable by the audience, a substitute advertisement is selected and displayed at step 610, and then step 512 is completed. The selection of a substitute advertisement may be made by selecting an advertisement transmitted with the primary advertisement, by selecting an advertisement designated by the advertisement control information, by selecting a default advertisement, or by any other suitable technique for selecting a substitute advertisement.

Finally, if at step 616 it is determined that the advertisement is not associated with a television program, then at step 620 it is once again determined if the advertisement is associated with a television network or channel. If it is determined at step 620 that the advertisement is associated with a television network or channel, then a substitute advertisement is selected and displayed at step 610, and step 512 is completed. Otherwise, if it is determined at step 620 that the advertisement is not associated with a television network or channel, then the advertisement is displayed or stored at step 608, and step 512 is completed.

Although a particular order of steps is illustrated in FIG. 6, it should be apparent that the tasks performed in those steps could be performed in different orders or concurrently, with appropriate modification to the steps, without departing from the spirit and scope of the present invention.

Figure 7:
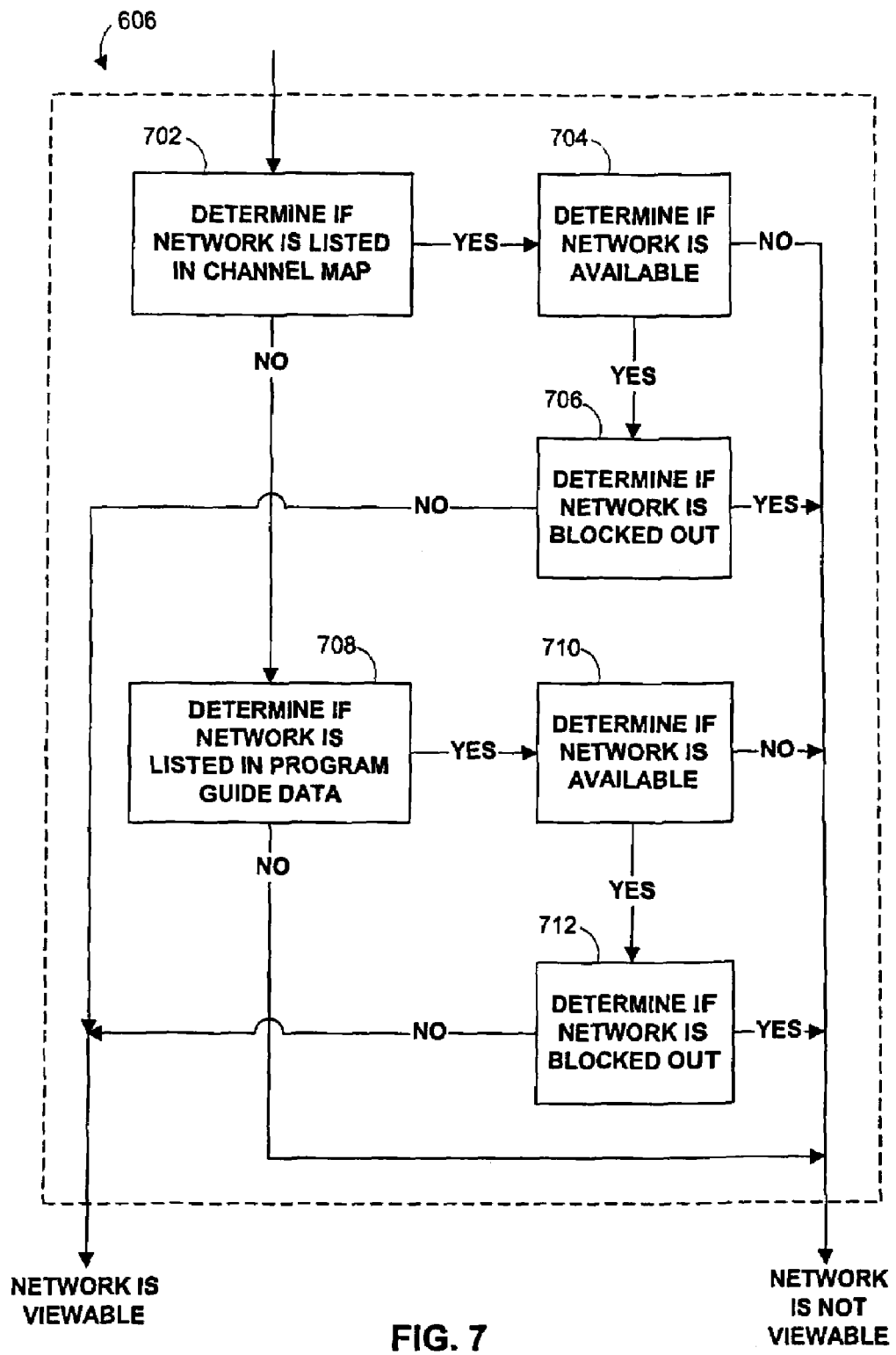
FIG. 7 is a flow chart of steps involved in determining if a television network is viewable by a television audience in accordance with one embodiment of the present invention.

An example of a process by which it may be determined at step 606 of FIG. 6 whether a network is viewable by an audience is illustrated in FIG. 7. As shown, at step 702, this process begins by determining if the network is listed in a channel map stored in television viewer equipment 106 performing the process of step 606. Two examples of channels maps that may be used in performing this step are shown in FIGS. 11 and 12 and discussed below. In the event that channel map information is not available to the process of step 606, step 702, and steps 704 and 706 which follow from step 702, need not be performed. If it is determined at step 702 that the network is listed in the channel map, at step 704 it is determined whether the network is available for viewing at the time or time range associated with the advertisement. The determination of step 704 may be a "yes" for every network listed in the channel map (e.g., for channel maps like that shown in FIG. 11) or for only those networks listed in the channel map that are indicated as being available for viewing (e.g., for channel maps like that shown in FIG. 12), and may be "no" for all other networks. If it is determined in step 704 that the network is not available for viewing, step 606 is completed and returns an indication that the network is not viewable.

Otherwise, if it is determined in step 704 that the network is available for viewing, it is determined at step 706 whether the network has been blocked out. A network may be blocked out by a parent wishing to screen his or her children from adult programming or by an automatic feature of a censorship system such as the "V" chip. A network may be blocked out because the network or channel for the network has been blocked or because a program on at the time or time range of the advertisement has been blocked. For blocking of networks and channels, the determination of whether a network has been blocked out may be "no" for every network listed in the channel map (e.g., for channel maps like that shown in FIG. 11) or for only those networks listed in the channel map that are indicated as not being blocked out (e.g., for channel maps like that shown in FIG. 12), and may be "yes" for all other networks. For blocked programs, the determination of whether a program is blocked may be made from a blocked program list or flags in program guide information. If it is determined in step 706 that the network is blocked out, step 606 is completed and returns an indication that the network is not viewable. Otherwise, if it is determined in step 706 that the network is not blocked out, step 606 is completed and returns an indication that the network is viewable.

If it is determined at step 702 that the network is not listed in the channel map, it is then determined at step 708 whether the network is listed in program guide information in the device performing the process of step 606. If program guide information is not available to the process of step 606, step 708, and steps 710 and 712 which follow step 708, may be skipped and step 606 may then complete and return a default indication either that the network is viewable or not viewable, as desired. The determination of whether the network is listed in the program guide information may be made by searching the program guide information and returning a "yes" indication if the network is found in the program guide information and a "no" indication if the network is not found in the program guide information. If it is determined at step 708 that the network is not listed in the program guide information, step 606 is completed and returns an indication that the network is not viewable. Otherwise, if it is determined at step 708 that the network is listed in the program guide information, it is determined at step 710 whether the network is available for viewing at the time or time range associated with the advertisement. This determination may be made by checking flags associated with the network in the program guide information. If it is determined at step 710 that the network is not available for viewing, step 606 is completed and returns an indication that the network is not viewable. Otherwise, if it is determined at step 710 that the network is available for viewing, it is determined at step 712 whether the network has been blocked out. This determination may be made by checking flags associated with the network in the program guide information, channel map, or a blocked-program list. If it is determined at step 712 that the network is blocked out, step 606 is completed and returns an indication that the network is not viewable. Otherwise, if it is determined at step 712 that the network is not blocked out, step 606 is completed and returns an indication that the network is viewable.

Figure 8:
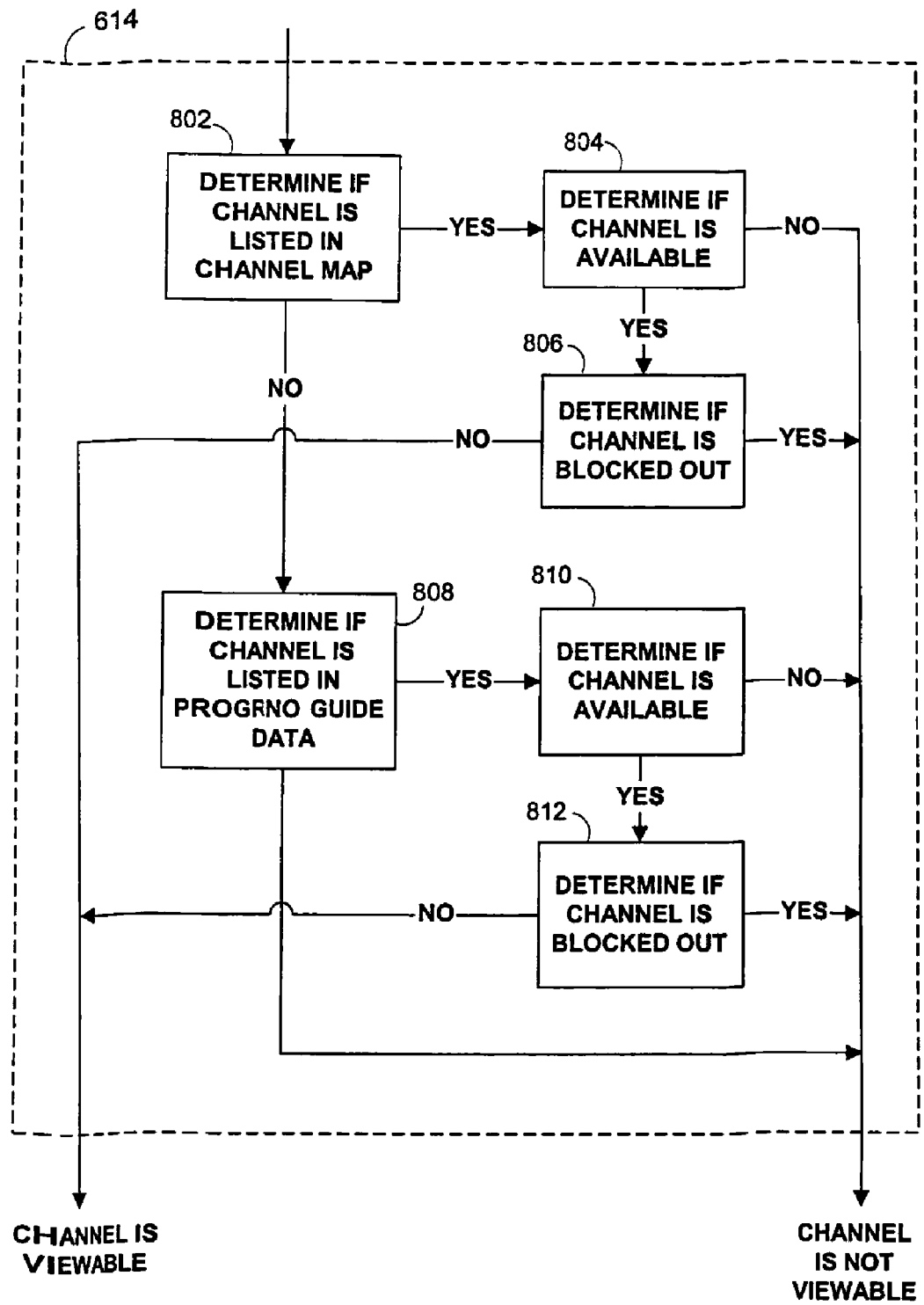
FIG. 8 is a flow chart of steps involved in determining if a television channel is viewable by a television audience in accordance with one embodiment of the present invention.

An example of a process by which it may be determined at step 614 of FIG. 6 whether a channel is viewable by an audience is illustrated in FIG. 8. As shown, at step 802, this process begins by determining if the channel is listed in channel map information stored in television viewer equipment 106 performing the process of step 614. Two examples of channels maps that may be used in performing this step are shown in FIGS. 10 and 12 and are discussed below. In the event that channel map information is not available to the process of step 614, step 802, and steps 804 and 806 which follow from step 802, need not be performed. If it is determined at step 802 that the channel is listed in the channel map information, it is then determined at step 804 whether the channel is available for viewing at the time or time range associated with the advertisement. The determination of step 804 may be "yes" for every channel listed in the channel map information or for only those channels listed in the channel map information that are indicated as being available for viewing (e.g., for channel maps like that shown in FIGS. 10 and 12), and may be "no" for all other channels. If it is determined in step 804 that the channel is not available for viewing, step 614 is completed and returns an indication that the channel is not viewable.

Otherwise, if it is determined in step 804 that the channel is available for viewing, it is then determined at step 806 whether the channel has been blocked out. A channel may be blocked out by a parent wishing to screen his or her children from adult programming or by an automatic feature of a censorship system such as the "V" chip. A channel may be blocked out because the channel or the channel's network has been blocked or because a program on at the time or time range of the advertisement has been blocked. For blocking of networks and channels, the determination of whether a channel has been blocked out may be "no" for every channel listed in the channel map or for only those channels listed in the channel map that are indicated as not being blocked out (e.g., for channel maps like that shown in FIGS. 10 and 12), and may be "yes" for all other channels. For blocked programs, the determination of whether a program is blocked may be made from a blocked program list or flags in program guide information. If it is determined in step 806 that the channel is blocked out, step 614 is completed and returns an indication that the channel is not viewable. Otherwise, if it is determined in step 806 that the channel is not blocked out, step 614 is completed and returns an indication that the channel is viewable.

If it is determined at step 802 that the channel is not listed in the channel map, it is then determined at step 808 whether the channel is listed in program guide information in television viewer equipment 106 performing the process of step 614. If program guide information is not available to the process of step 614, step 808, and steps 810 and 812 which follow step 808, may be skipped and step 614 may then complete and return a default indication either that the channel is viewable or not viewable, as desired. The determination of whether the channel is listed in program guide information may be made be searching the program guide information and returning a "yes" indication if the channel is found in the program guide information and a "no" indication if the channel is not found in the program guide information. If it is determined at step 808 that the channel is not listed in the program guide information, step 614 is completed and returns an indication that the channel is not viewable. Otherwise, if it is determined at step 808 that the channel is listed in the program guide information, it is determined at step 810 whether the channel is available for viewing at the time or time range associated with the advertisement. This determination may be made by checking flags associated with the channel in the program guide information. If it is determined at step 810 that the channel is not available for viewing, step 614 is completed and returns an indication that the channel is not viewable. Otherwise, if it is determined at step 810 that the channel is available for viewing, it is determined at step 812 whether the channel has been blocked out. This determination may be made by checking flags associated with the channel in the program guide information, channel map, or a blocked program list. If it is determined at step 812 that the channel is blocked out, step 614 is completed and returns an indication that the channel is not viewable. Otherwise, if it is determined at step 812 that the channel is not blocked out, step 614 is completed and returns an indication that the channel is viewable.

Figure 9:
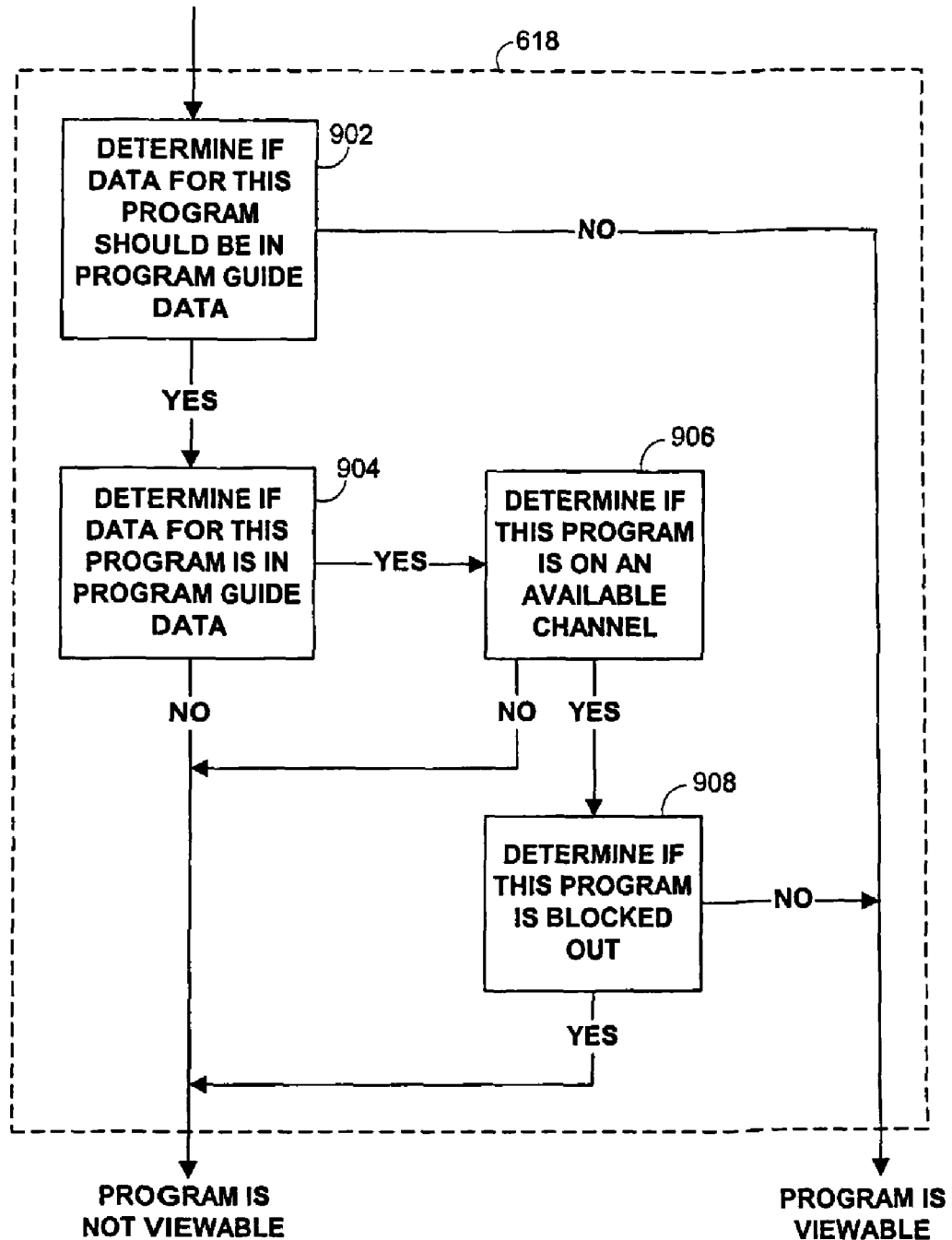
FIG. 9 is a flow chart of steps involved in determining if a television program is viewable by a television audience in accordance with one embodiment of the present invention.

An example of a process by which step 618 of FIG. 6 may determine whether a program is viewable by an audience is illustrated in FIG. 9. As shown, the process begins by determining at step 902 whether data for the program should be present in program guide information stored in television viewer equipment 106 performing the process of step 618. In the event that program guide information is not available to the process of step 618, the process may skip steps 902, 904, 906, and 908, after which step 616 may then be completed and return a default indication that the program is either viewable or not viewable, as desired. The determination of whether information for a program should be in the program guide information may be made by checking to see if the program is going to air at a date and time for which other information is available, if the program is on a network or channel for which there is program guide information, or by any other suitable technique.

If it is determined in step 902 that information for the program should not be in the program guide information, step 618 is completed and returns an indication that the program is viewable. Otherwise, if it is determined in step 902 that information for the program should be in the program guide information, it is then determined at step 904 whether information for this program actually is in the program guide information. This determination may be made by searching through the program guide information to determine if information corresponding to the program is present. If it is determined at step 904 that information for the program is not present, step 618 completes and returns an indication that the program in not viewable. Otherwise, if it is determined at step 904 that information for the program is present, it is then determined at step 906 whether this program is on an available channel at the time or time range associated with the advertisement. This determination may be made by first determining from the program guide information the channel on which the program is to air, and then by checking flags associated with that channel in the program guide information. If it is determined at step 906 that the program is not on an available channel, step 618 is completed and returns an indication that the program is not viewable. Otherwise, if it is determined at step 906 that the program is on an available channel, it is determined at step 908 whether the channel has been blocked out. A program may be blocked out because the channel or channel's network on which it is to be aired has been blocked or because the program has been blocked. This determination may be made by checking flags associated with the channel in the program guide information, the channel map, or a blocked-program list. If it is determined at step 908 that the channel has been blocked out, step 618 is completed and returns an indication that the program is not viewable. Otherwise, if it is determined at step 908 that the channel has not been blocked out, step 618 is completed and returns an indication that the program is viewable.

FIGS. 10-12 illustrate examples of channel maps that may be used with the present invention. As shown in FIG. 10, channel map 1000 includes six columns of information. In the channel number column 1002, a channel number is listed for each source of programming listed in column 1004. These channel numbers are used by a viewer as a familiar mechanism to select a particular source of programming. For example, when a viewer selects channel "2," television viewer equipment 106 presents to the viewer the programming provided by source ID (identification) number "1000," which may be programming on a particular broadcast frequency, digital channel, etc.

In the source ID column 1004, a source identification number is listed for each source of programming that may be received using television viewer equipment 106. The number assigned to each source of programming listed in source ID column 1004 may be any number, is preferably unique for each source of programming, and preferably enables the device using channel map 1000 to receive the programming provided by the source corresponding to that number.

In the available column 1006, a boolean flag is listed for each source of programming. Each flag may indicate whether a particular viewer is capable of receiving the programming from the corresponding source. This capability of the viewer may be based upon whether the viewer has paid for the programming (if desired; however, it is preferred to display advertisements regardless of whether programs have been paid for by the viewer), whether the programming is offered in the viewer's area, whether the programming is blacked out in the viewer's area (e.g., as is frequently done with sporting events), etc.

In the blocked out column 1008, a boolean flag is listed for each source of programming. Each flag may indicate whether a particular viewer has indicated that a source of programming is undesirable, and therefore should not be viewable, or an automatic censoring system such as the "V" chip has designated the source of programming as to be censored. Even though a source of programming may be blocked out, advertisements for that programming are preferably presented to induce the viewers to view the programming. However, the advertisements may be blocked also, if desired.

In the start time column 1010 and the end time column 1012 are start and end times for the time periods during which each channel number is associated with a particular source identification number. For example, channel number 6 is associated with source identification number 1050 from 12 a.m. (0000) through 12 p.m. (1200) and with source identification number 1075 from 12 p.m. (1200) through 12 a.m. (2400).

As shown in FIG. 11, channel map 1100 includes four columns of data, a source ID column 1102, a network ID column 1104, a start time column 1106, and an end time column 1108. Source ID column 1102 lists a source identification number for each source of programming that may be received using television viewer equipment 106. These source identification numbers may be substantially the same as those listed in column 1004 of channel map 1000 of FIG. 10. In network ID column 1104, network identification numbers are listed for each source of programming. Each network identification number may be any number and is preferably unique for each network. Since not all sources of programming are associated with a network, some or all of these network identification numbers may correspond to "no network" (e.g., as shown, the network number "2000" appears for each of sources "1015" and "1018" to indicate that they are not associated with a network). Also, two or more of the sources of programming may be associated with the same network (e.g., as shown, network number "2001" appears for each of sources "1000" and "11075"). In start time column 1106 and end time column 1108, start and end times are listed for the association of each network listed in column 1104 and the corresponding source in column 1102.

As shown in FIG. 12, a channel map 1200 may also be used which is a combination of channel maps 1000 and 1100. Channel map 1200 incorporates a channel number column 1202, a source ID column 1204, a network ID column 1206, an available column 1208, a block-out column 1210, a start time column 1212, and an end time column 1214. Each of columns 1202, 1204, 1206, 1208, and 1210, and the data each contain, may be substantially the same as that in columns 1002, 1004, 1104, 1006, and 1008, respectively, of maps 1000 and 1100. Columns 1212 and 1214 represent the start and end times during which each channel is associated with a source of programming and the network indicated is affiliated with that source of programming.

Although, the channel maps of FIGS. 10-12 are shown with particular columns of data, other types of data could be used in the channel maps, and the channel maps could be split up or consolidated, as necessary, in accordance with the present invention.

Figure 13:
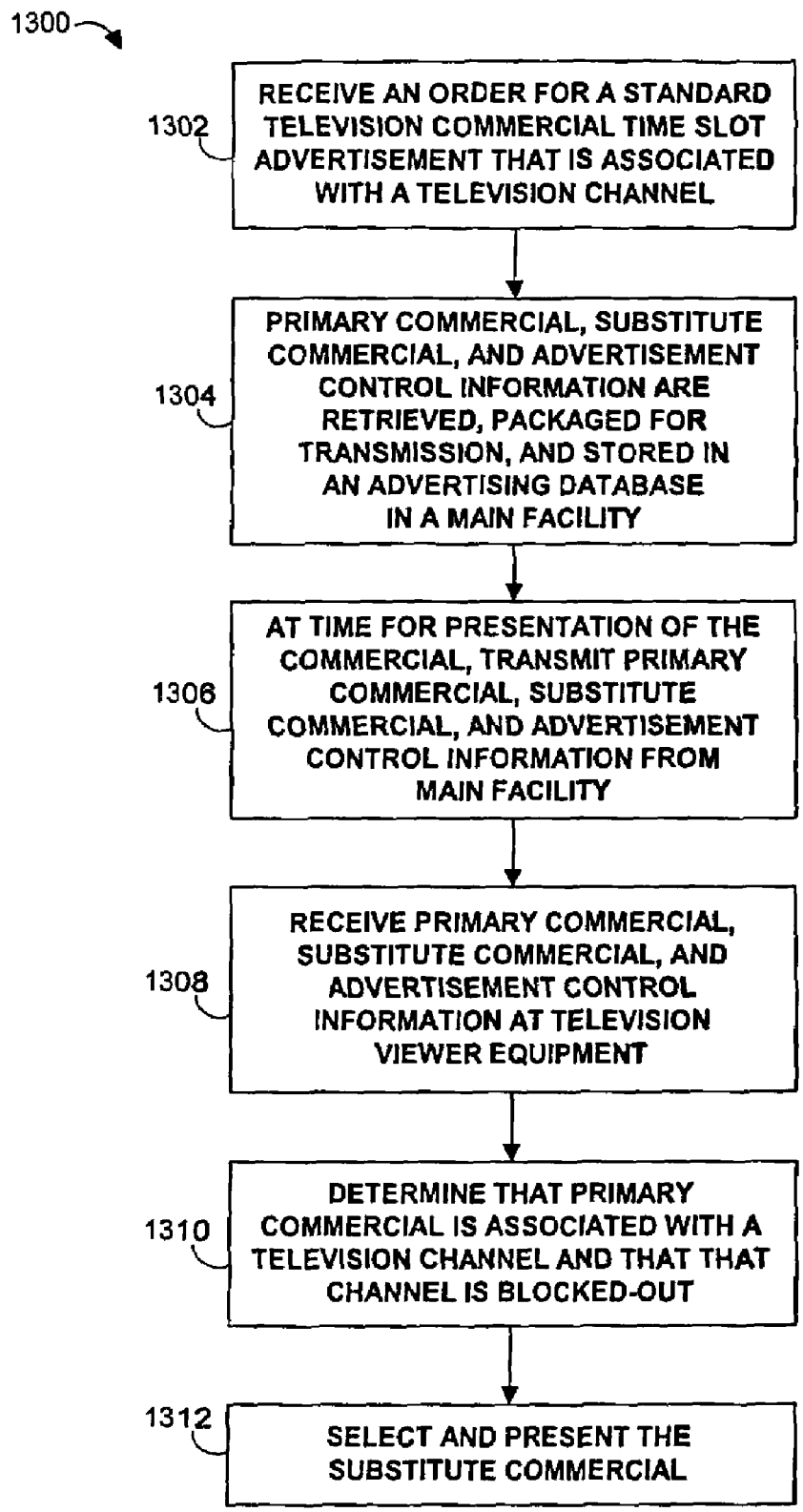
FIG. 13 is a flow chart of steps involved in presenting an advertisement for a television channel in a standard commercial television time slot in accordance with one embodiment of the present invention.
Figure 14:
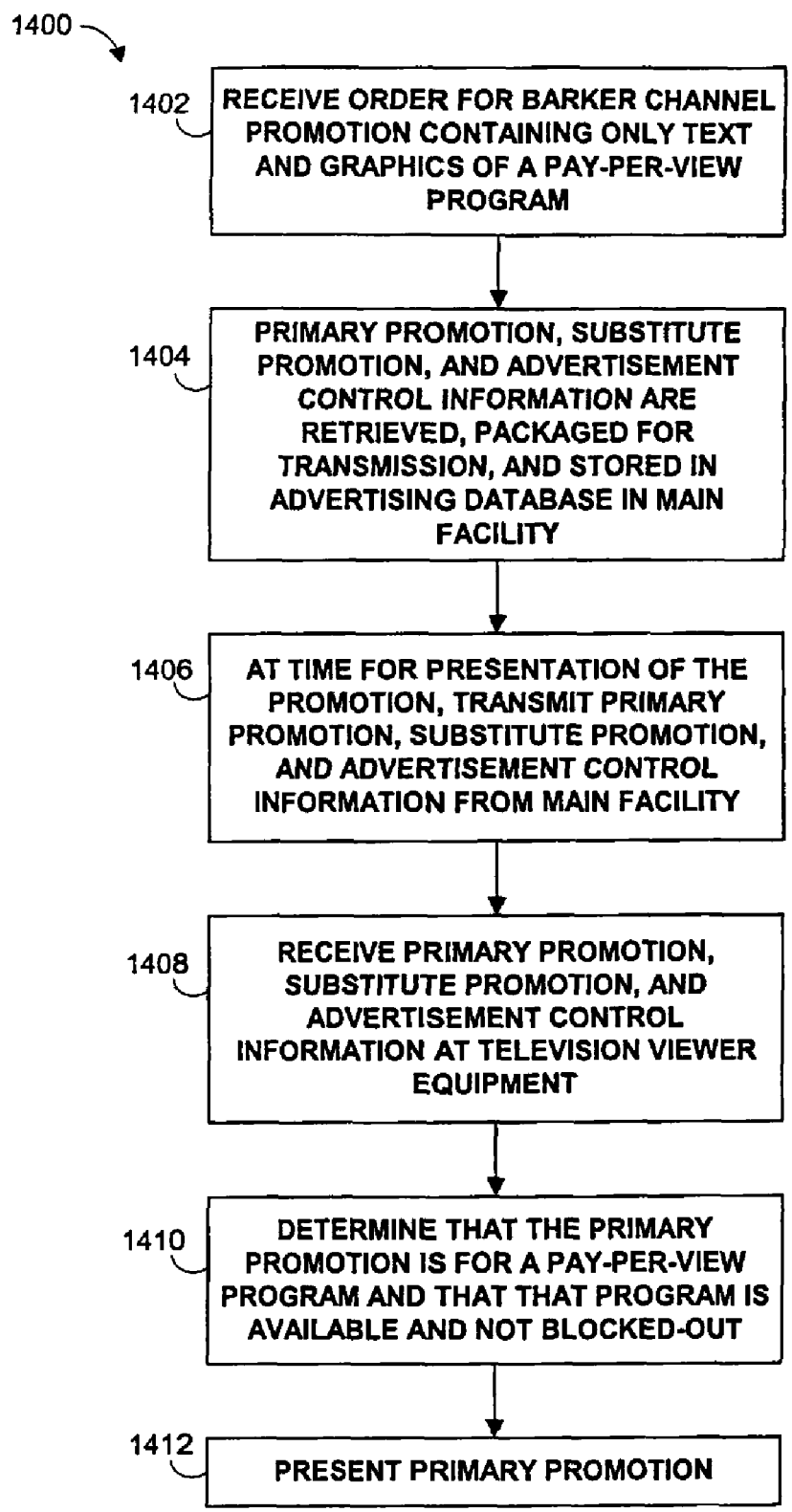
FIG. 14 is a flow chart of steps involved in presenting a barker channel promotion containing only text and graphics for a pay-per-view program in accordance with one embodiment of the present invention.
Figure 15:
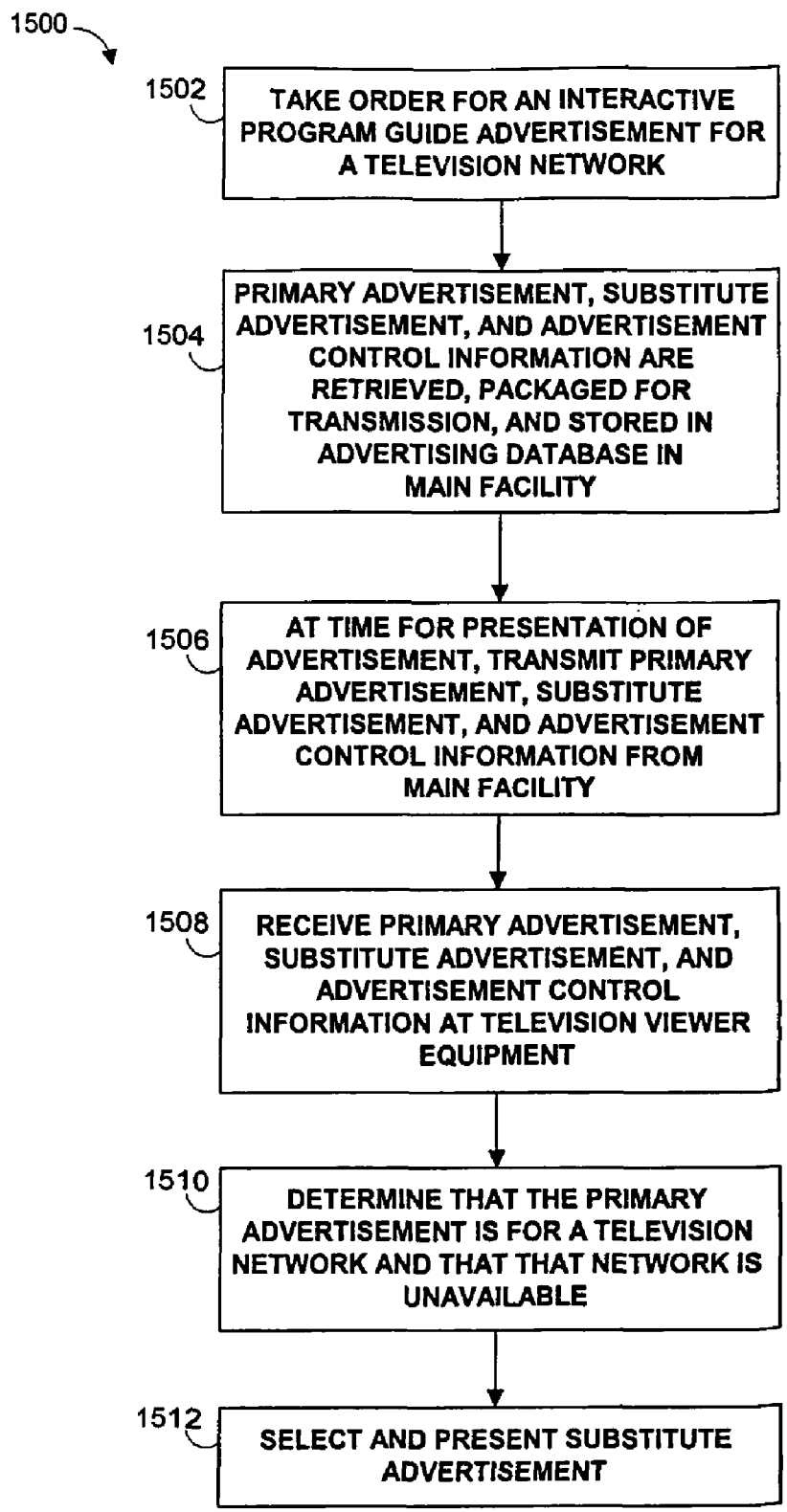
FIG. 15 is a flow chart of steps involved in presenting an advertisement for a television network in an interactive program guide in accordance with one embodiment of the present invention.

As mentioned above, the displaying of advertisements for television networks, channels, and programs in the present invention may be accomplished by presenting full motion video, still images, graphics, text, and audio during standard commercial television time slots, on barker television screens, in passive and interactive television program guides, using any other suitable techniques, or using a combination of these or other suitable techniques, if desired. FIGS. 13, 14, and 15 illustrate examples of the steps that may be taken in presenting advertisements in a few of these approaches in accordance with the present invention.

FIG. 13 shows an example 1300 of steps that may be performed in system 100 of FIG. 1 in presenting an advertisement for a television channel in a standard commercial television time slot in accordance with the present invention. Starting at step 1302, an order for a standard-television-commercial-time-slot advertisement that is associated with a television channel is received at an advertisement order entry computer 111 in a main facility 102. A primary commercial, a substitute commercial, and advertisement control information are then retrieved from the advertising database 114 in main facility 102, packaged for transmission, and stored back in advertising database 114 in main facility 102 at step 1304. During the packaging of step 1304, the primary and substitute commercials may be converted from their native format to another format, such as MPEG-2 (Moving Picture Experts Group) format. Just prior to the time for the presentation of the commercial, at step 1306, the packaged primary commercial, substitute commercial, and advertisement control information are transmitted from advertising database 114 in main facility 102 to television viewer equipment 106. The transmission of step 1306 is performed using digital channels in communications link 108 and communications paths 110. At step 1308, the primary commercial, the substitute commercial, and the advertisement control information are then received at television viewer equipment 106. Television viewer equipment 106 then determines at step 1310 that the primary commercial is associated with a television channel, and, from channel map information stored in television viewer equipment 106, that that television channel is available, but has been blocked out. Finally, at step 1312, the substitute commercial is selected and presented by the interactive program guide.

FIG. 14 shows an example 1400 of steps that may be performed in system 100 of FIG. 1 in presenting an advertisement for a pay-per-view program in the form of a barker television screen in accordance with the present invention. Starting at step 1402, an order for a barker channel promotion containing only text and graphics for a pay-pay-view program is received at an advertisement order entry computer 111 in a main facility 102. A primary promotion, a substitute promotion, and advertisement control information are then retrieved from the advertising database 114 in main facility 102, packaged for transmission, and stored back in advertising database 114 in main facility 102 at step 1404. Just prior to the time for the presentation of the promotion, at step 1406, the packaged primary promotion, substitute promotion, and advertisement control information are transmitted from advertising database 114 in main facility 102 to television viewer equipment 106. At step 1408, the primary promotion, the substitute promotion, and the advertisement control information are then received at television viewer equipment 106. Television viewer equipment 106 then determines at step 1410 that the primary promotion is associated with a pay-per-view program, and, from program guide information stored in television viewer equipment 106, that that program is available and has not been blocked out. Finally, at step 1412, the primary promotion is presented.

FIG. 15 shows an example 1500 of steps that may be performed in system 100 of FIG. 1 in presenting an advertisement for a television network in an interactive television program guide in accordance with the present invention. Starting at step 1502, an order for an interactive program guide advertisement for a television network is received at an advertisement order entry computer 111 in a main facility 102. A primary advertisement, a substitute advertisement, and advertisement control information are then retrieved from the advertising database 114 in main facility 102, packaged for transmission, and stored back in advertising database 114 in main facility 102 at step 1504. Just prior to the time for the presentation of the advertisement, at step 1506, the packaged primary advertisement, substitute advertisement, and advertisement control information are transmitted from advertising database 114 in main facility 102 to television viewer equipment 106. At step 1508, the primary advertisement, the substitute advertisement, and the advertisement control information are then received at television viewer equipment 106. An interactive program guide application in television viewer equipment 106 then determines at step 1510 that the primary advertisement is associated with a television network, and, from program guide information stored in television viewer equipment 106, that that network is unavailable. Finally, at step 1512, the substitute advertisement is presented by the interactive program guide.

An example of a "grid" interactive program guide display screen 1600 incorporating an advertisement 1604 is illustrated in FIG. 16. As shown, screen 1600 may have a title 1602, an advertisement 1604, and a program grid 1606. Title 1602 may be any text or logo indicating a source of the guide information. Advertisement 1604 may include text, graphics, and any other visual presentation, and any or all of the text, graphics, or other visual presentation may be still or moving. Additionally, advertisement 1604 may also include an audio portion that may or may not be synchronized to the visual portion of the displayed presentation. Although advertisement 1604 is shown as using a narrow strip of screen 1600, advertisement 1604 could use any portion of screen 1600 or could use the entire visible area of screen 1600 during a portion of the time the interactive program guide controlling screen 1600 is active. Program grid 1606 may be of the channel-time-grid format illustrated, or may be of any other format. In the channel-time-grid format shown, one axis of the grid displayed lists channel numbers (in this instance, the vertical axis), the other axis of the grid displayed lists times (in this instance, the horizontal axis), and the cells within the grid show program information. A user of screen 1600 may view program information by scrolling through grid 1606 by pressing up and down cursor keys on a remote control that controls set-top box 124 on which the program guide is implemented.

Figure 17:
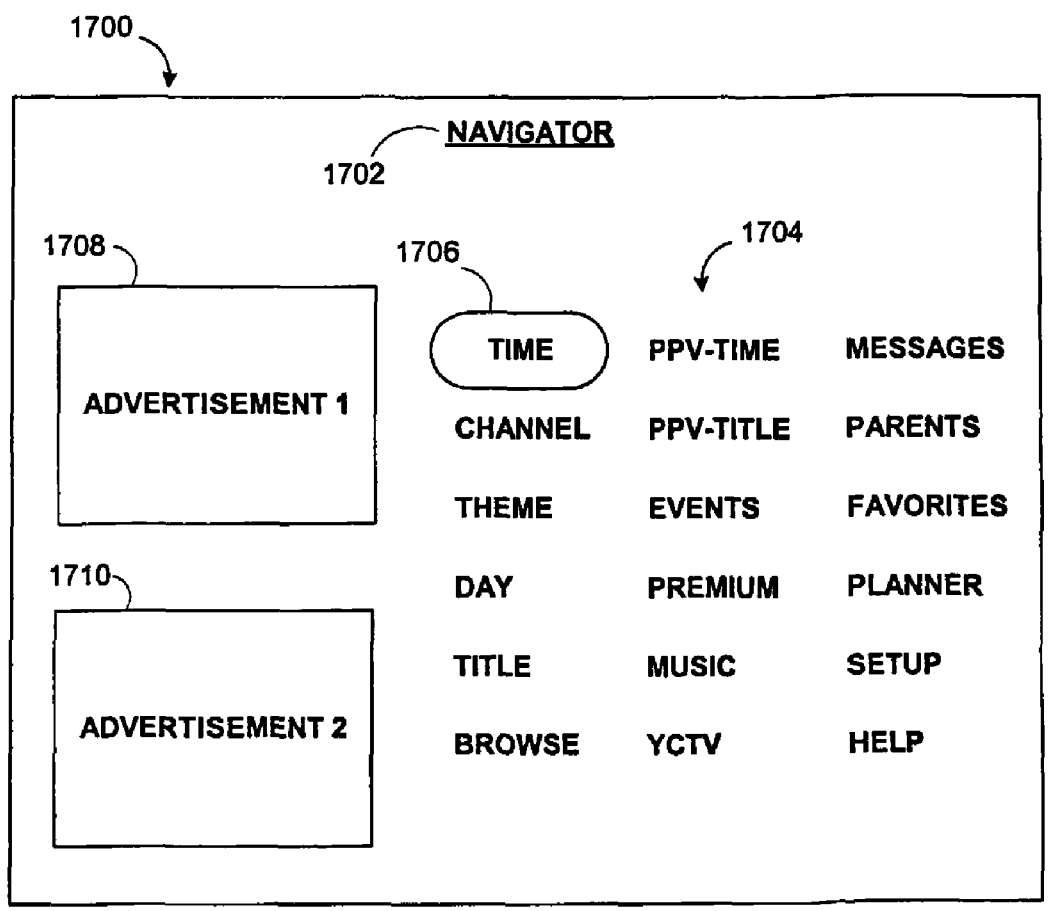
FIG. 17 is a depiction of a "navigator" interactive program guide display screen showing two advertisement areas for presenting advertisements in accordance with one embodiment of the present invention.

An example of a "navigator" interactive program guide display screen 1700 incorporating advertisements is illustrated in FIG. 17. As shown, screen 1700 may have a title 1702, one or more advertisements 1708 and 1710, and a navigator menu 1704. Title 1702 may be any text or logo indicating the source of the guide information or the name of the navigator feature of the interactive program guide display. Advertisements 1708 and 1710 may include text, graphics, and any other visual presentation, and any or all of the text, graphics, or other visual presentation may be still or moving. Additionally, advertisement 1708 and 1710 may also include audio portions that may or may not be synchronized to the visual portions of the displayed presentations. Although advertisements 1708 and 1710 are shown as using two particular areas of screen 1700, advertisements 1708 and 1710 could use any portions of screen 1700 or could use the entire visible area of screen 1700 during a portion of the time the interactive program guide controlling screen 1700 is active. Navigator menu 1704 may permit navigation through interactive program guide data by allowing a user to select one of the options listed in menu 1704 using cursor 1706 and then view the data based on the selected option. For example, the user could select "TIME" and then view all program guide data for programs on at a subsequently designated time. As another example, the user could select "TITLE" and then view all program guide data for programs corresponding to a subsequently designated title. As yet another example, the user could select "CHANNEL" and then view all program guide data for programs being and to be aired on a subsequently designated channel.

Figure 18:
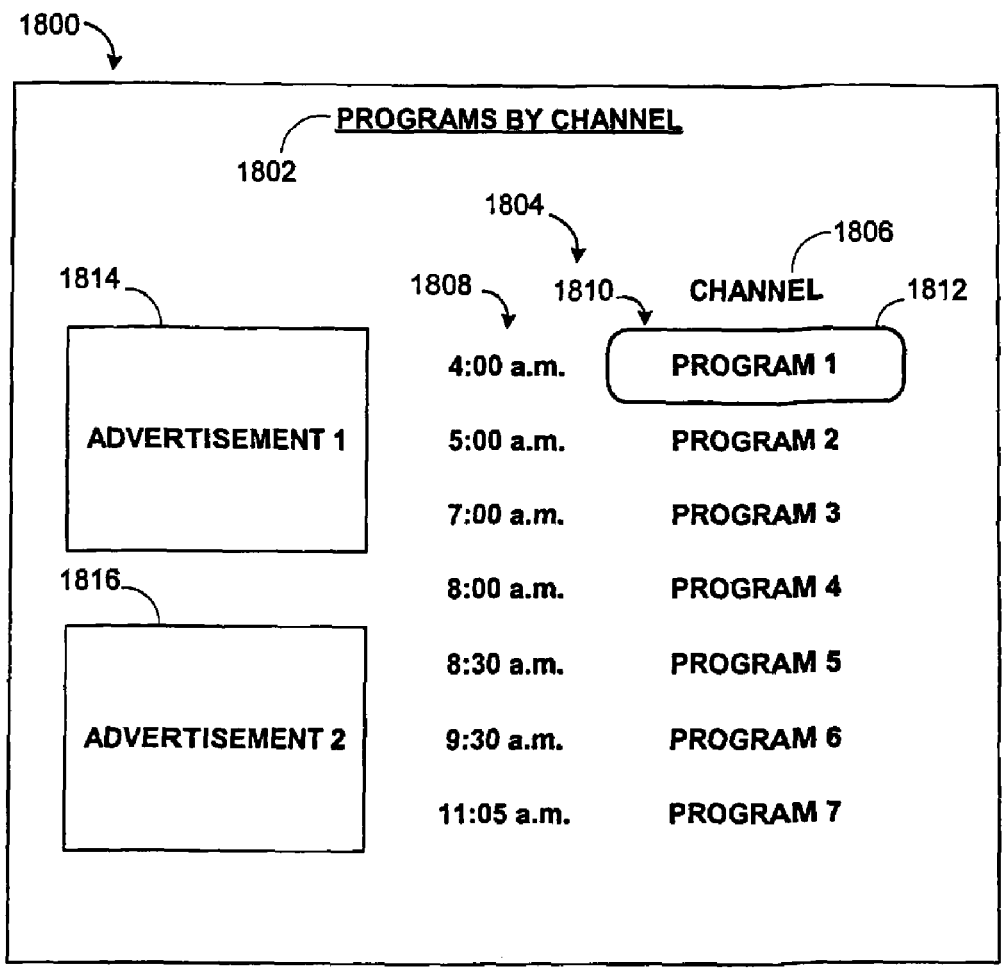
FIG. 18 is a depiction of a "programs by channels" interactive program guide display screen showing two advertisement areas for presenting advertisements in accordance with one embodiment of the present invention.

An example of such a interactive program guide display screen is illustrated in FIG. 18. As shown, a "programs by channel" screen 1800 may have a title 1802, one or more advertisements 1814 and 1816, and a program listing 1804. Title 1802 may be any text or logo indicating a source of the guide information or the name of the programs-by-channel feature of the interactive program guide display. Advertisements 1814 and 1816 may include text, graphics, and any other visual presentation, and any or all of the text, graphics, or other visual presentation may be still or moving. Additionally, advertisements 1814 and 1816 may also include audio portions that may or may not be synchronized to the visual portions of the displayed presentations. Although advertisements 1814 and 1816 are shown as using particular areas of screen 1800, advertisements 1814 and 1816 could use any portions of screen 1800 or could use the entire visible area of screen 1800 during a portion of the time the interactive program guide controlling screen 1800 is active. Program listing 1804 may present a list of programs on a designated channel over a given time period as shown. The designated channel may be indicated in channel name display 1806, the given time period may be indicated by time displays 1808, and the programs may be indicated by program names 1810. In preferred embodiments of screen 1800 further information on any selected program may be available by selecting the program using cursor 1812.

Other examples of presenting advertisements in interactive television program guides are discussed in Knudson et al. U.S. patent application Ser. No. 09/034,939, filed Mar. 4, 1998, Knudson et al. U.S. patent application Ser. No. 09/070,604, filed Apr. 30, 1998, Knudson et al. U.S. patent application Ser. No. 09/070,555, filed Apr. 30, 1998, and Boylan, III et al. U.S. patent application Ser. No. 09/070,700, filed Apr. 30, 1998, which are hereby incorporated by reference herein in their entireties.

Figure 19:
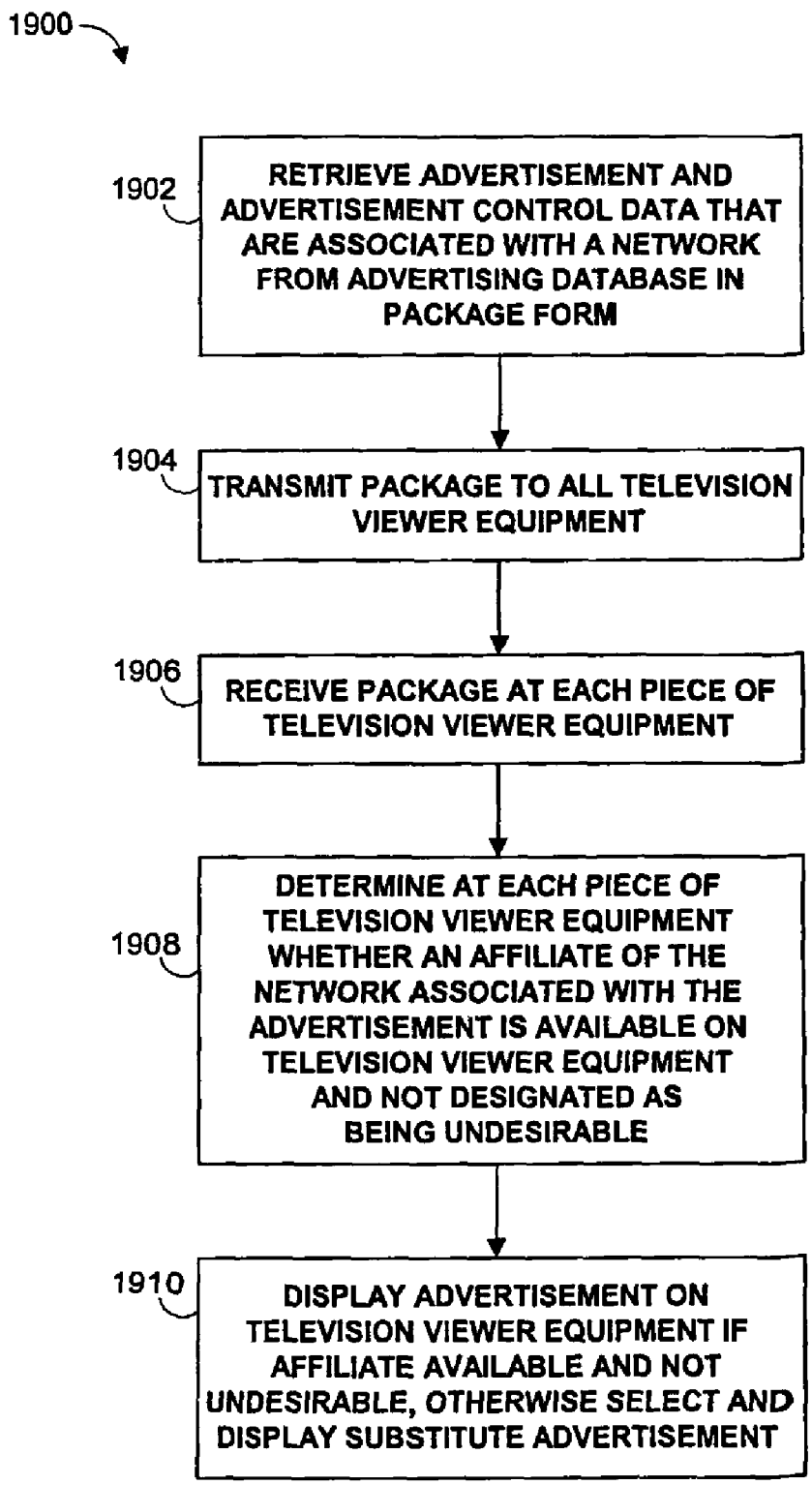
FIG. 19 is a flow chart of steps involved in transmitting, receiving, processing, and displaying an advertisement for a television network by making only a single broadcast of the advertisement to all television systems in accordance with one embodiment of the present invention.

FIG. 19 illustrates an example 1900 of steps that may be taken by system 100 of FIG. 1 in transmitting, receiving, processing, and displaying an advertisement associated with a television network in accordance with the present invention. Starting at step 1902, an advertisement and advertisement control information that are associated with a television network are retrieved in package form from advertising database 114 in main facility 102. The package advertisement and information are then transmitted to all television viewer equipment 106 by way of communications link 108, television distribution facilities 104, and communications paths 110 at step 1904. Next, at step 1906, the advertisement and advertisement control information package is received at each piece of television viewer equipment 106. By running a process such as that shown in FIG. 7 and described above, each piece of television viewer equipment 106 then determines at step 1908 whether an affiliate of the network associated with the received advertisement is available on television viewer equipment 106 and has not been designated as being undesirable. If it is determined at step 1908 that an affiliate of the network associated with the advertisement is available and has not been blocked out, then the advertisement is displayed at step 1910. Otherwise, step 1910 selects and displays a substitute advertisement.

The foregoing is merely illustrative of the principles of this invention and various modifications can be made by those skilled in the art without departing from the scope and spirit of the invention.

What is claimed is:

1. A system for controlling the presentation of advertisements to a television viewer, comprising:
   an advertising database that stores an advertisement, wherein the advertisement is an advertisement for a network or channel;
   a program guide database that stores program guide information for a network, channel, or programming on a network or channel; and
   television viewer equipment configured to:
      receive the advertisement from the advertising database;
      receive advertisement control information associated with the advertisement;
      receive a request from a viewer to block a network or channel;
      block the display of program guide information for the network or channel that is blocked by the request;
      determine, using the advertisement control information, whether or not the advertisement from the advertising database is for the network or channel that is blocked by the request; and
      block display of the advertisement on a network or channel that is available to the television viewer equipment when the television viewer equipment determines that the advertisement is for the network or channel that is blocked by the request.

2. The system defined in claim 1 further comprising a channel map database that stores channel map information, wherein the television viewer equipment is further configured to receive the channel map information from the channel map database and use the channel map information to block the display of the advertisement on the television viewer equipment.

3. The system defined in claim 1 wherein the television viewer equipment is further configured to block the display of the advertisement on the television viewer equipment if the channel, network, or programming is unavailable to the television viewer equipment.

4. The system defined in claim 1 wherein the television viewer equipment is further configured to block the display of the advertisement on the television viewer equipment when the network, channel, or programming should have corresponding program guide information and does not have the corresponding program guide information.

5. The system defined in claim 1 wherein the advertising database is part of a television distribution facility.

6. The system defined in claim 1 wherein the advertising database is part of a main facility.

7. The system defined in claim 1 wherein the advertisement control information comprises at least a network identifier.

8. A method for controlling the presentation of advertisements to a television viewer, the method comprising:
   storing an advertisement in an advertising database, wherein the advertisement is an advertisement for a network or channel;
   storing program guide information for a network, channel, or programming on a network or channel in a program guide database;
   receiving the advertisement from the advertising database with television viewer equipment;
   receiving with the television viewer equipment advertisement control information associated with the advertisement;
   receiving a request from a viewer to block a network or channel;
   blocking the display of program guide information for the network or channel that is blocked by the request;
   determining with the television viewer equipment, using the advertisement control information, whether or not the advertisement from the advertising database is for the network or channel that is blocked by the request; and
   blocking display of the advertisement on a network or channel that is available to the television viewer equipment when the television viewer equipment determines that the advertisement is for the network or channel that is blocked by the request.

9. The method defined in claim 8 further comprising:
   storing channel map information in a channel map database;
   receiving with the television viewer equipment the channel map information from the channel map database; and
   using the channel map information by the television viewer equipment to block the display of the advertisement on the television viewer equipment.

10. The method defined in claim 8 wherein blocking the display of the advertisement comprises blocking the display of the advertisement if the channel, network, or programming is unavailable to the television equipment.

11. The method defined in claim 8 wherein blocking the display of the advertisement comprises blocking the display of the advertisement when the network, channel, or programming should have corresponding program guide information and does not have the corresponding program guide information.

12. The method defined in claim 8 further comprising implementing the advertising database as a part of a television distribution facility.

13. The method defined in claim 8 further comprising implementing the advertising database as a part of a main data storage and control facility.

14. The method defined in claim 8 wherein the advertisement control information comprises at least a network identifier.

15. The system defined in claim 1 wherein the television viewer equipment is further configured to select a substitute advertisement to be displayed on said television viewer equipment instead of the blocked advertisement, wherein the substitute advertisement relates to network, channel, or programming on a network or channel that is available on the television viewer equipment.

16. The method defined in claim 8 further comprising selecting a substitute advertisement to be displayed on said television viewer equipment instead of the blocked advertisement, wherein the substitute advertisement relates to network, channel, or programming on a network or channel that is available on the television viewer equipment.

* * * * *